(12) United States Patent
Bull et al.

(10) Patent No.: US 7,762,310 B2
(45) Date of Patent: Jul. 27, 2010

(54) CLADDING SUPERPLASTIC ALLOYS

(75) Inventors: Michael J. Bull, Brighton, MI (US);
David J. Lloyd, Bath (CA); Phil Morris, Bath (CA); Paul A. Wycliffe, Kingston (CA); Robert Bruce Wagstaff, Green Acres, WA (US); Alok K. Gupta, Kingston (CA); Gijsbertus Langelaan, Kingston (CA)

(73) Assignee: Novelis Inc., Toronto (CA)

( * ) Notice: Subject to any disclaimer, the term of this patent is extended or adjusted under 35 U.S.C. 154(b) by 593 days.

(21) Appl. No.: 11/786,840

(22) Filed: Apr. 12, 2007

(65) Prior Publication Data

US 2008/0008903 A1 Jan. 10, 2008

Related U.S. Application Data

(60) Provisional application No. 60/792,124, filed on Apr. 13, 2006.

(51) Int. Cl.
*B22D 11/00* (2006.01)
*B22D 7/02* (2006.01)
*B22D 19/16* (2006.01)

(52) U.S. Cl. .............. 164/461; 164/95; 164/98
(58) Field of Classification Search .......... 164/461, 164/91, 94, 95, 98
See application file for complete search history.

(56) References Cited

U.S. PATENT DOCUMENTS

| 3,206,808 | A | 9/1965 | Robinson |
| 4,411,962 | A | 10/1983 | Johnson |
| 4,567,936 | A * | 2/1986 | Binczewski ............... 164/453 |
| 4,978,054 | A | 12/1990 | Ferrando et al. |
| 6,234,243 | B1 | 5/2001 | Murching et al. |
| 6,286,750 | B1 | 9/2001 | Iwadachi |
| 6,705,384 | B2 * | 3/2004 | Kilmer et al. ............ 164/461 |
| 7,472,740 | B2 * | 1/2009 | Anderson et al. ......... 164/461 |
| 7,617,864 | B2 * | 11/2009 | Gallerneault ............. 164/461 |
| 2005/0011630 | A1 | 1/2005 | Anderson et al. |

(Continued)

FOREIGN PATENT DOCUMENTS

JP 59-023837 A2 2/1984

(Continued)

OTHER PUBLICATIONS

English translation of JP 59-23837, Feb. 7, 1984, Takeshi Hattori.

(Continued)

*Primary Examiner*—Kevin P Kerns
(74) *Attorney, Agent, or Firm*—Cooper & Dunham LLP

(57) ABSTRACT

A method of producing a clad sheet article having superplastic properties, and the resulting clad sheet article. The method involves producing a cladding layer onto at least one rolling face of a core ingot made of a metal having superplastic properties, preferably by co-casting, to form a clad ingot and then rolling said clad ingot to produce a sheet article. The core ingot includes an element that diffuses from an interior of the ingot to a surface at superplastic forming temperatures thereby deteriorating surface properties of the ingot. The cladding layer is provided with an element (dopant) that reacts with the element of the core to reduce the ability of the element to diffuse through the cladding layer.

12 Claims, 22 Drawing Sheets

U.S. PATENT DOCUMENTS

2005/0064226 A1* 3/2005 Benedictus et al. ......... 428/654
2007/0215312 A1 9/2007 Gallerneault
2007/0215313 A1 9/2007 Wagstaff

FOREIGN PATENT DOCUMENTS

| JP | 61-49796 A | * | 3/1986 |
| JP | 61-049796 A2 | | 3/1986 |
| JP | 05-025573 A | | 2/1993 |
| WO | WO 2006/053701 A2 | | 5/2006 |

OTHER PUBLICATIONS

English translation of JP 61-49796, Mar. 11, 1986, Mitsuo Hino.

* cited by examiner

CLADDING SUPERPLASTIC ALLOYS

CROSS-REFERENCE TO RELATED APPLICATIONS

This application claims the priority right of our prior U.S. provisional patent application Ser. No. 60/792,124, filed Apr. 13, 2006.

BACKGROUND OF THE INVENTION (1) Field of the Invention

This invention relates to superplastic alloys, especially those made primarily of aluminum. More particularly, the invention relates to the cladding of superplastic alloys to modify and improve their surface characteristics.

(2) Description of the Related Art

Superplastic alloys are crystalline metals that can be deformed well beyond their usual breaking point of less than 100%, and that may be stretched by at least 200%, and often by more than 1000%, during tensile deformation at elevated temperatures. Sometimes, reference is made to metals having "enhanced plasticity". Such metals typically have deformation properties at the low end of the range of "superplastic" metals, but are still capable of extending more than similar conventional metals. It should be understood that the present discussion encompasses metals having both superplastic and enhanced plasticity. For the sake of convenience, only the term "superplastic" will be used in the following to refer to metals of both kinds.

Superplastic metals elongate and become thinner in a very uniform manner when drawn under tension rather than forming a "neck" (i.e. a local narrowing) which leads to fracture. Instead of forming a neck, the material eventually fails by the slow coalescence of small internal voids until a continuous crack is developed. Such metals usually have a fine grain crystalline structure (e.g. less than 10 micrometers) with a fine dispersion of thermally stable particles which act to pin the grain boundaries and maintain a fine grain structure at high temperatures. The fine grain size is necessary to allow the characteristic deformation mode known as "grain boundary sliding" to occur. The aluminum alloys which show this property generally have a high content of alloying elements, e.g. magnesium, copper or zinc. Typical examples are alloys such as AA5083, AA7075 and Supral® alloys produced by Superform USA of Riverside, Calif. (typically Al, 6 wt. % Cu, 0.4 wt. % Zr). The Mg-containing alloys of the AA5000 series are the most popular ones for producing automotive components. Superplastic alloys of the AA7000 series (containing less Mg—e.g. as low as 1.9 wt %—but high contents of Zn) are currently more popular for aerospace applications.

Superplastic alloys may be used to form objects of complex shape by the application of pressure by means of a gas or with a forming tool, and often with the help of dies (e.g. by means of the Quick Plastic Forming (QPF) process). Aluminum and titanium parts are often superplastically formed for aerospace and, increasingly, automobile applications.

The state of superplasticity is achieved at high temperature, typically more than half the absolute melting point of the alloy concerned, and often around 500° C. (and generally above 400° C.) in aluminum-based alloys. Unfortunately, the commercially relevant Mg-containing alloys (in particular) become susceptible to oxidation and/or surface deterioration during such processing and also during service due to their high content of Mg. These alloys may also become difficult to join together to construct into parts for automobiles and the like after the high temperature forming operation.

Consequently, there is a need to modify or improve superplastic alloys to avoid such problems.

U.S. Pat. No. 4,411,962 which issued to Robert M. Johnson on Oct. 25, 1983 discloses the formation of a metal laminate including one or more layers of superplastic material metallurgically bonded to one or more layers of non-superplastic material in order to achieve high strength while retaining superplastic properties. Bonding of the layers is carried out by diffusion bonding (heated to temperatures below the melting points of the metal) or roll bonding (sheets are rolled together to reduce their thickness and to promote bonding).

U.S. Pat. No. 3,206,808 which issued to Grover C. Robinson on Sep. 21, 1965 relates to the continuous or semi-continuous casting of ingots of aluminum and aluminum alloys. It does not, however, involve the treatment of superplastic alloys.

BRIEF SUMMARY OF THE INVENTION

An exemplary embodiment of the invention provides a method of producing a clad sheet article, which method comprises: providing a cladding on at least one face of a core ingot made of an alloy having superplastic properties, preferably by co-casting, to form a clad ingot; and rolling the clad ingot to produce a sheet article having a core layer and at least one cladding layer; wherein the chosen alloy of the core ingot includes an element that diffuses from an interior of the core layer to a surface thereof at temperatures required for superplastic forming of the article and that causes surface deterioration when present at an outer surface of the article, and the cladding layer is chosen to include an element that interacts with the element of the core to reduce diffusion of the element of the core through the cladding layer.

Another exemplary embodiment of the invention provides a clad sheet article having superplastic properties, comprising a core layer of a metal having superplastic properties, and a cladding layer of metal on at least one face of the core layer, wherein the core layer includes an element that diffuses from an interior of the core layer to a surface at superplastic forming temperatures, thereby deteriorating surface properties of the article, and the cladding layer includes an element that reacts with the element of the core to reduce the ability of the element to diffuse through the cladding layer.

According to yet another exemplary embodiment of the invention, there is provided a method of producing a clad ingot, which method comprises providing a cladding on at least one face of a core ingot made of an alloy having superplastic properties by co-casting to form a clad ingot; wherein the alloy of the core ingot includes an element that diffuses from an interior of the core layer to a surface thereof at temperatures required for superplastic forming of an article produced from the clad ingot by rolling, and that causes surface deterioration when present at an outer surface of the article, and the cladding layer is chosen to include an element that interacts with the element of the core to reduce diffusion of the element of the core through the cladding.

According to yet another exemplary embodiment, there is provided a clad sheet ingot having superplastic properties, comprising a core of a metal having superplastic properties, and a cladding of a metal on at least one face of the core, wherein the core includes an element that diffuses from an interior of the core to a surface at superplastic forming temperatures, thereby deteriorating surface properties of a sheet article produced from the clad ingot by rolling, and the cladding includes an element that reacts with the element of the core to reduce the ability of the element to diffuse through the cladding.

BRIEF DESCRIPTION OF THE SEVERAL VIEWS OF THE DRAWINGS

FIG. 5(b) is one of the specimens tested at 525° C.—voids in the core near the clad interface seem to initiate clad breaching);

DETAILED DESCRIPTION OF THE INVENTION

Figure 1:
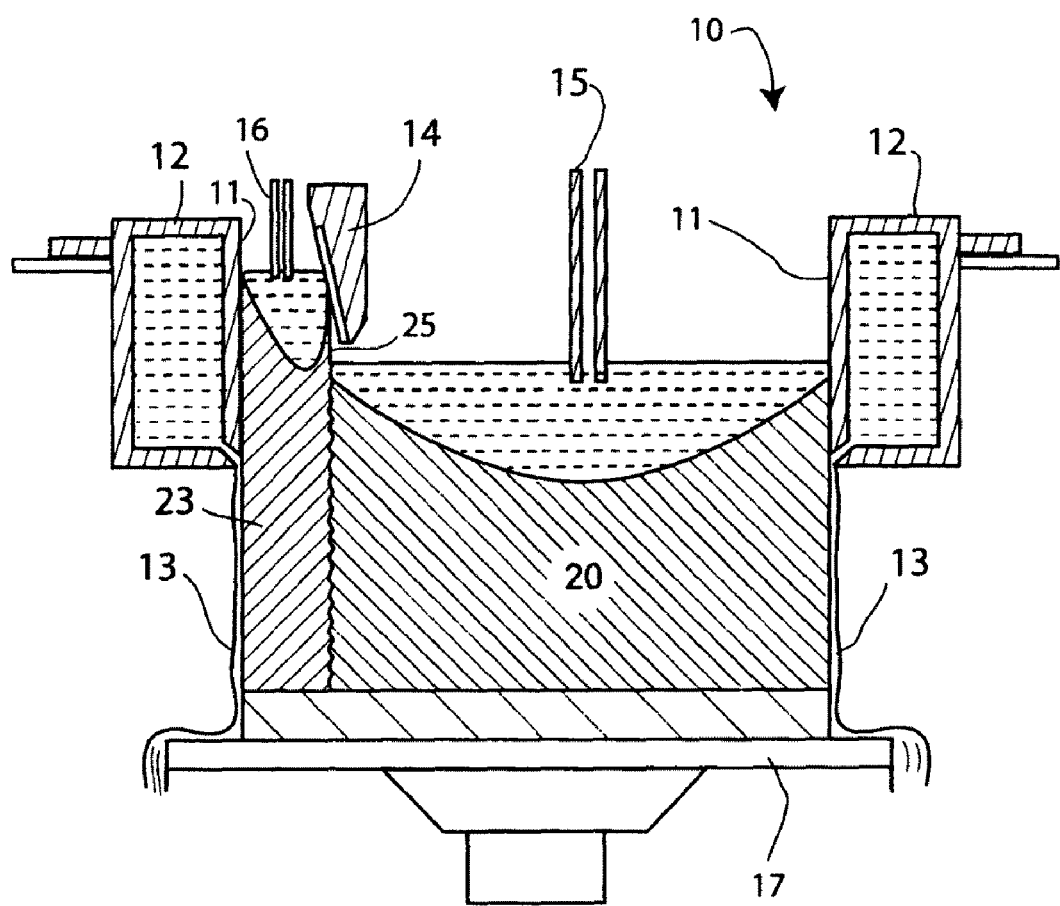
FIG. 1 is an elevation in partial section showing an example of a co-casting apparatus used in the present invention.

The present invention makes it possible to produce a sheet metal article having a core layer exhibiting superplastic properties at elevated temperatures and having a cladding layer of a different metal on at least one surface that reduces or eliminates surface problems or degradation of the resulting metal product caused by diffusion of one or more elements from the core layer to the surface of the clad article.

It has been found that surface problems or degradation of superplastic metals are generally the result of the diffusion of at least one reactive alloying element from the interior of the metal to the surface where the element may undergo oxidation or other reactions, or causes adhesion difficulties with other metals. Some alloying elements used in aluminum alloys diffuse through the metal only slowly, whereas others (e.g. magnesium and zinc) diffuse quite rapidly. It is generally the metals that have a high rate of diffusion, and especially those that also have a high susceptibility to oxidation, that cause surface problems in the finished products.

When a superplastic alloy contains an element that is a fast-diffuser and that quickly migrates to the surface during high temperature forming operations, merely coating or cladding the outer surface of the superplastic alloy with a layer of a different (less reactive) alloy may not avoid the problems because the rapidly-diffusing element(s) from the core may penetrate and diffuse quickly through the thin coating layer and reach the outer surface of the coated article and, once again, cause surface degradation and related problems.

A fast-diffusing element may be defined as one which diffuses faster than the self-diffusion of the solvent metal. Magnesium in aluminum is one example of this and Cu in Si is another. From a practical viewpoint, any element that can diffuse through a cladding layer to the surface during a high temperature forming operation could be considered a "fast-diffusing" element for the purposes of this invention. The following Table 1 provides the necessary data to compute the diffusivities as a function of temperature for various species in aluminum.

TABLE 1

Diffusivity coefficients of several elements for solid state diffusion in Al: Data obtained from Smithells Metals Reference Book, 6$^{th}$ Edition; E. A. Brandes, editor; Butterworths, London; 1983; ISBN 0-408-71053-5

| Species in Al | $D_0$ (cm$^2$/s) | Q (kcal/mol) |
| --- | --- | --- |
| Al | 2.25 | 34.5 |
| Mg | 0.0623 | 27.44 |
| Si | 2.48 | 32.75 |
| Cu | 0.647 | 32.27 |
| Fe | 135 | 46.0 |
| Zn | 0.259 | 28.86 |

The data in Table 1 represent the parameters in the Arrhenius rate equation as applied to diffusion: $D(T)=D_0\exp(-Q/RT)$. The data show that Mg and Zn are "fast-diffusers" in that their exponential parameter (Q) is less than that of Al and hence, at high enough temperatures, will tend to diffuse faster than Al does. It is to be noted that Fe is an exceptionally slow diffuser.

In the present invention, it has been found that an improvement can be obtained if the coating or cladding layer is doped with (i.e. contains) an element that blocks the diffusion of the rapidly-diffusing element from the superplastic core to the outer surface of the cladding layer, and hence stops or considerably reduces the diffusion of the element from the core to the surface of the product. This blocking action may be the result of the formation of an intermetallic compound in the form of precipitates (e.g. S-phase particles) by reaction between the doping element of the cladding layer and the rapidly diffusing element of the core. The rapidly diffusing element is consequently converted to another form that is very slow to diffuse or remains completely fixed in place during metal processing and forming.

As an example, many superplastic aluminum alloys used for automotive applications contain relatively large amounts of magnesium (normally at least about 4 wt. %, and often 4.0 to 4.9 wt. % Mg) which diffuse rapidly at superplastic metal forming temperatures through the metal core and any metal cladding that may be present. Magnesium is highly susceptible to oxidation when present at the surface. It has, however, been found that a cladding layer containing silicon and/or copper is highly effective in blocking the diffusion of magnesium through the cladding layer to the outer surface of the product, and hence can provide a metal article with enhanced surface characteristics. It is believed that silicon is effective because it reacts with the magnesium to form $Mg_2Si$. Thus, the magnesium diffuses into a silicon-bearing clad layer to form $Mg_2Si$ particles in the clad layer coated on the high magnesium core. The clad layer thereafter may have properties different from those of the original clad layer. When copper is used as a dopant for the clad layer, it is believed that $Al_2CuMg$ and $Al_6CuMg_4$ may form. Once the Mg atoms, formerly in solid solution, become "trapped" in such intermetallic particles they can no longer diffuse through the cladding layer to the outer surface. However, it is noted that the blocking effect of Cu may be observed only if the product is superplastically formed at temperatures below about 400° C. as copper may dissolve into solution at higher temperatures.

The amounts of silicon and/or copper required in the cladding layer are at least the minimum amounts that have the desired effect of blocking the migration of Mg. In practice, it is found that the cladding layer should preferably contain 0.3 wt. % Si or more, and/or 0.3 wt. % Cu or more. For Si, the preferred range is 0.5-2.0 wt. %, and more preferably 0.5-1.0 wt. %. For Cu, the preferred range is 0.3-1.3 wt. %. The elements Si and/or Cu are, of course, present in many aluminum alloys. The aluminum alloy may contain other elements, but elements that tend to diffuse rapidly and cause surface problems should, of course, be absent or present only in only very minor amounts. For example, an amount of Mg at the surface of the article up to 0.8 wt. % may be tolerated because of the resulting minimal surface deterioration, but it is most preferred that the amount be about 0.5 wt. % or less, and ideally zero. The metal of the cladding layer should be chosen with this in mind.

In the case of superplastic alloys containing significant amounts of zinc as the primary alloying element, e.g. the AA 7xxx series of alloys, it has been found that oxidation of zinc to form ZnO at the surface is not a significant problem despite the high oxidation potential of zinc. While Zn is cathodic with respect to Al, this is generally mitigated by the passivating effect of the oxide ($Al_2O_3$) which quickly forms on aluminum. Nevertheless, during a forming operation, the passivating effect of the $Al_2O_3$ layer is reduced due to the continuous exposure of new surface. In this case the Al remains effectively anodic to the Zn. At the elevated temperatures typical of superplastic forming, however, another phenomenon may have potentially detrimental effects, namely the volatility of the Zn. This means that the Zn present at the surface of the alloy may sublime or evaporate. This may leave the surface depleted of Zn if the metal is held at high temperatures for a sufficiently long period. Given this phenomenon, applying a clad layer (possibly containing a dopant that prevents the migration of Zn) to a superplastic 7xxx alloy may provide benefit to the resulting article by preventing the loss of Zn by sublimation or evaporation, should that occur to a detrimental degree during high temperature forming operations.

In addition to the Zn present in 7xxx alloys, Mg may also present in moderate quantities (e.g. at least 1.9 wt. %) to allow the formation of $Al_3Mg_4Zn_3$ intermetallic precipitates which have a significant strengthening contribution. For example, the alloy AA7075, which may show superplastic behaviour, contains 2.1-2.9 wt. % Mg. This Mg content is high enough that the formation of MgO at the surface may be detrimental to the product. On this basis, therefore, applying a cladding to prevent the formation of MgO is appropriate and desirable.

The cladding layer may be applied to the superplastic alloy core metal by any suitable means, but is most preferably applied by co-casting a layer of the cladding metal onto a core ingot made of superplatic metal alloy. This is especially effective when carried out using the co-casting method and apparatus described in U.S. Pat. No. 7,472,740 issued on Jan. 6, 2009, to Anderson et al. (the disclosure of which publication is specifically incorporated herein by reference). This method and apparatus makes it possible to co-cast metals to form a core ingot and at least one cladding layer and to produce a substantially continuous metallurgical bond between the metal layers.

FIG. 1 of the accompanying drawings shows, in elevation and partial cross-section, a co-casting mold assembly similar to that of the Anderson et al. publication. This shows a rectangular casting mould assembly 10 that has mould walls 11 forming part of a water jacket 12 from which a stream of cooling water 13 is dispensed.

The entry portion of the mould is divided by a divider wall 14 (referred to as a "chill") into two feed chambers. A molten metal delivery nozzle 15 feeds a first alloy into one feed chamber and a second metal delivery nozzle 16 feeds a second alloy into a second feed chamber. A vertically movable bottom block unit 17 supports the composite ingot as it is formed and fits into the outlet end of the mould prior to starting a cast and thereafter is lowered to allow the ingot to form.

Figure 2:
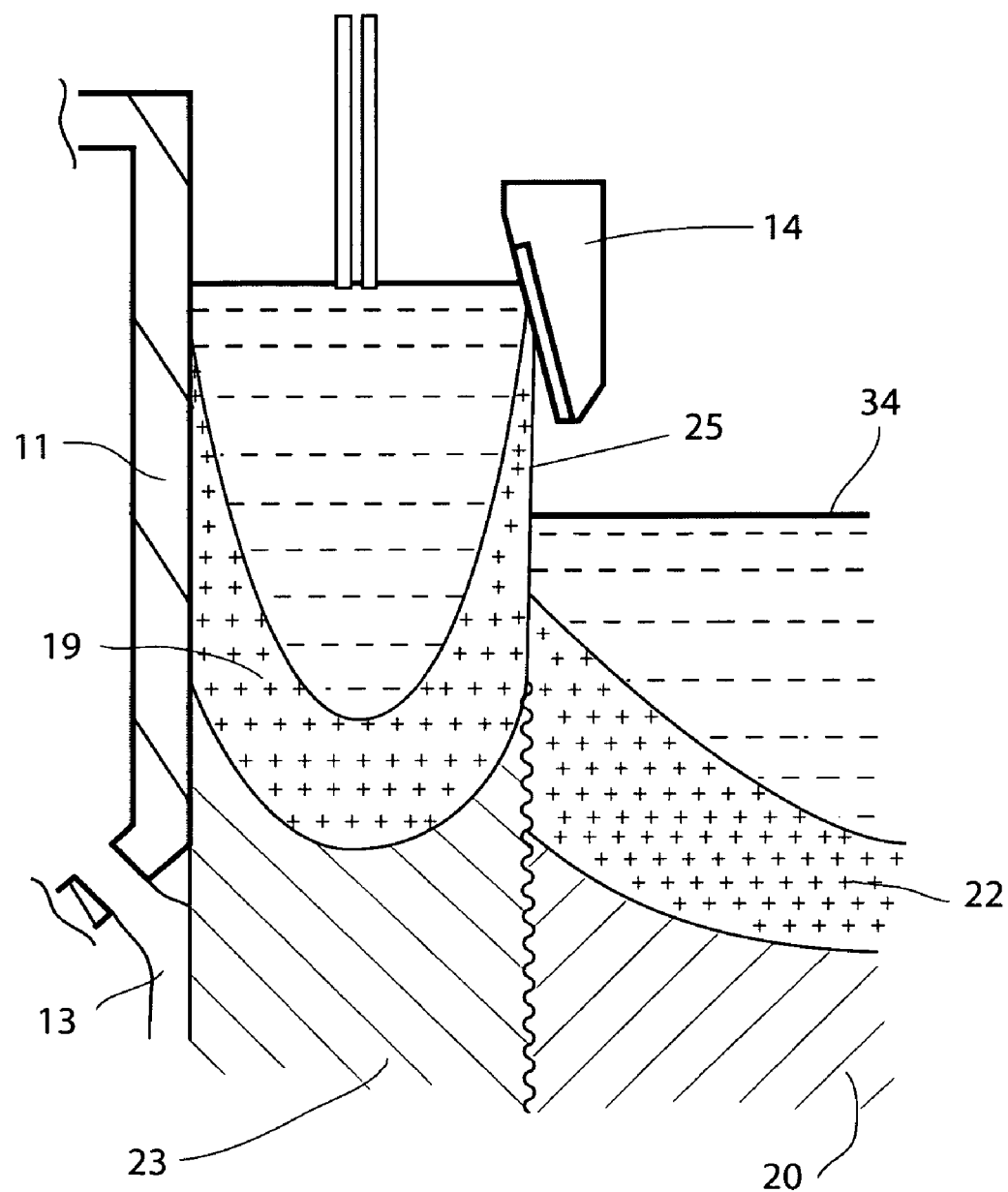
FIG. 2 is an enlargement of part of the apparatus of FIG. 1 showing contact between the co-cast metals.

The body of metal 23 fed from nozzle 16 destined to form the cladding layer is maintained at a higher level in the mold than the body of metal 20 fed from nozzle 15 destined to form the core (this being the preferred arrangement for a highly alloyed core and a more dilute cladding alloy). The divider wall 14 is cooled (by means not shown) so that the metal of the cladding layer forms a self-supporting semi-solidified surface 25 before it comes into contact with the molten metal 20 of the core. In fact, as shown more clearly in FIG. 2, a zone 19 that is between liquid and solid (i.e. between the liquidus and solidus of the metal—often referred as a mushy zone or semi-solid zone) may exist in the metal 23 immediately below the divider wall 14. Below this mushy or semi-solid zone is a solid metal alloy, and liquid metal exists above the zone. The liquid alloy 20 provided for the core has also forms a mushy zone 22 with solid metal below and liquid metal above.

As disclosed in the prior patent application, the temperature of the divider wall 14 is maintained at a predetermined target temperature so as to create a chilled interface which serves to control the temperature of the self supporting surface 25 below the lower end of the divider wall 14. An upper surface 34 of the metal 20 in the second chamber is then preferably maintained at a position below the lower end of the divider wall 14 and at the same time the temperature of the self supporting surface 25 is maintained such that the surface 34 of the metal 20 contacts this self supporting surface 25 at a point where the temperature of the surface 25 lies between the solidus and liquidus temperature of the metal 23. Typically, the surface 34 is maintained at a point slightly below the lower end of the divider wall 14, generally within about 2 to 20 mm from the lower end. The interface thus formed between the two alloy streams at this point forms a very strong, oxide-free metallurgical bond between the two metal layers without causing excessive mixing of the alloys.

In the present invention, cladding metal is cast onto one, and preferably both, rolling faces of a generally rectangular ingot made of a superplastic alloy by a co-casting technique. If cladding on both sides of the core is required, the apparatus of FIG. 1 would be modified to provide a dividing wall 14 at each side of the mold. After formation, the resulting clad ingot is subjected to normal hot and/or cold rolling to produce a clad sheet suitable for manufacture into a desired product, such as an automobile part.

The relative thickness of the cladding layer to the superplastic core before (and after) rolling, and the absolute thickness of the cladding layer in the final rolled sheet article, may be important for some or all core/clad alloy combinations. Since the alloy used for the cladding is not usually itself superplastic, there may be a balance required between making the cladding layer(s) so thick in relation to the core that the desired superplastic properties of the resulting product are adversely affected (or entirely eliminated), and making the cladding so thin that the migration of the rapidly diffusing element from the core is not effectively prevented. Appropriate thicknesses may vary for different alloy combinations.

The cladding layer will extend in the same way as the core without cracking or loss of adherence when it is within a suitable thickness range, but this may not be the case if significantly thicker layers are employed. For high Mg alloys, at least, it is found that the cladding layer(s) does not extend to the same extent as the core if the total thickness of the (or both) cladding layers is 30% or more of the total thickness of the clad ingot or rolled sheet article. The transition from a cladding layer that follows superplastic extensions of the core fully to one that does not probably occurs gradually (i.e. depending on the degree of extension required) and it is believed that suitable properties are exhibited when the total thickness of the or both cladding layers compared to the total thickness of the clad product is in the range of 15 to 25%, more preferably 15 to 20%. In generally, the cladding layer(s) follow superplastic extensions fully when their total thickness is 15% or less. This means that for a clad product having just one cladding layer, the thickness of the cladding should be less than 30% of thickness of the total clad product, preferably less than a value within the range of 15 to 25%, more preferably less than a value in the range of 15 to 20%, and ideally 15% or less. For a product having two cladding layers (of equal thickness), each layer should have a thickness of less than 15%, preferably less than a value of 7.5 to 12.5%, more preferably less than a value of 7.5 to 10%, and ideally 7.5% or less (based on the total thickness of the core and the cladding layers). For a product having a single cladding layer, if the core has a thickness of 925 micrometers, the cladding layer ideally has a thickness of about 75 micrometers.

The minimum thickness required for preventing diffusion of the element of the core will again differ for different alloy combinations and possibly different gauges of the core layer. However, at least for superplastic alloys containing high levels of Mg, and cladding layers containing Si or Cu, the minimum preferred thickness is about 50 μm (for each clad layer), and more preferably at least 75 μm, when the total thickness of the rolled clad sheet article is about 250 μm. A preferred range is 50 to 500 μm, and more preferably 75 to 150 μm. Purely from a diffusion perspective, there is no upper limit because the thicker the layer, the better it will be at preventing diffusion to the surface.

Figure 3:
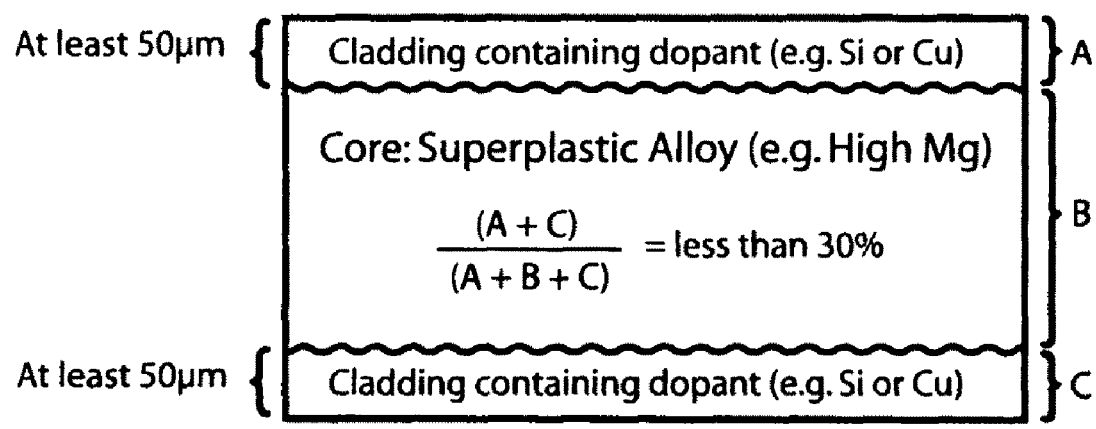
FIG. 3 is a sketch representing a rolled sheet article according to one possible embodiment of the invention.

These preferred dimensions are represented in the form of a sketch in FIG. 3 of the accompanying drawings. This represents a case in which there are cladding layers A and C on each side of the core B of the rolled sheet article. For a rolled article having just one cladding layer, the ratio of A to (A+B) would be less than 30%.

The metals used for cladding may themselves have superplastic properties, but this is not essential and, in fact, would not be usual.

Experiment 1

This section describes the details of experiments and computer simulations performed to assess the high temperature properties of a clad material. Tensile tests and inter-diffusion experiments and simulations were performed. The material for the mechanical testing was a dilute AA3003 clad layer on an AA5083 core. The material was commercially cold rolled to a final gauge of 1.245 mm and additional specimens were obtained from an intermediate gauge at 1.9 mm. The specimens were deformed in tension at temperatures ranging from 450° C. to 525° C. At all temperatures, the samples from both thicknesses showed elongations of more than 300%. The greatest elongations were observed at 500° C.

The diffusion studies were performed to assess the feasibility of using Si or Cu to inhibit the diffusion of Mg through the clad layer to the surface. As already noted, the Si may slow Mg diffusion by the formation of $Mg_2Si$, while Cu may encourage the formation of $Al_2CuMg$ and $Al_6CuMg_4$. The feasibility of this was studied experimentally using model materials consisting of a core AA5083 alloy and cladding layer with either Al-1 wt. % Cu, or Al-0.5 wt. % Si. Similar alloy combinations were studied in mathematical models using the DICTRA® software package produced by Thermo-Calc Software of Stockholm Technology Park, Björnnäsvägen 21, SE-113 47 Stockholm, Sweden. The experiments and the computer simulations indicate that the Si-containing alloy does reduce Mg diffusion by forming $Mg_2Si$ for thermal treatments up to 575° C. while the Cu-containing clad may possibly be effective only up to a maximum temperature of 485° C.

One of the proposed applications for the clad products which can readily be manufactured by the co-casting technology is aluminum sheet which shows good high temperature (~500° C.) formability yet retains a good surface quality. The ideal surface quality is one which shows a smooth, bright surface. To achieve a bright surface, the formation of MgO at the surface must be inhibited. The standard high temperature formability alloy for automotive applications is AA5083 and in particular its low Fe, elevated Mn variant. The Mg content in this type of alloy is nominally 4.75 wt. %. The formation of significant quantities of MgO at the surface is a well-known phenomenon for such high Mg-containing alloys due to the rapid diffusion of Mg to the surface.

The co-casting technology mentioned earlier permits high Mg-containing alloys to be clad with alloys containing little or no Mg and hence these clad layers may act as diffusion barriers and prevent the Mg from reaching the surface and forming the aesthetically unappealing MgO. In addition to the unattractive appearance caused by the surface oxide, the oxide must be treated after forming to yield better joining and painting characteristics. Preventing MgO from developing at the surface may therefore reduce manufacturing costs for the automotive industry.

This section is divided into two parts. The first one discusses the mechanical properties and the microstructures developed under these conditions. The second section describes the experiments and computer simulations performed to assess the feasibility of using Si or Cu to inhibit Mg diffusion by encouraging the formation of intermetallic particles.

Part 1—Mechanical Properties

Experimental Procedures

The material used in this study was manufactured using commercial production facilities, having been cast with a clad alloy of dilute AA3003 and a core of a variant within AA5083 specifications. The chemical composition of the core and clad alloys are listed in Table 2 below.

TABLE 2

Chemical compositions of the cast core and clad alloys.
The composition quoted is in wt. %.

|  | Si | Fe | Cu | Mn | Mg | Cr | Zn | Ti |
|---|---|---|---|---|---|---|---|---|
| AA5083 | 0.036 | 0.078 | 0.009 | 0.692 | 4.800 | 0.177 | 0.016 | 0.014 |
| AA3003 (dilute) | 0.064 | 0.12 | 0.007 | 0.36 | 0.04 | 0.16 | 0.01 | 0.011 |

From the place of casting, the ingot was transferred to a rolling works for hot rolling. A preheat and heat-soak treatment was carried out prior to hot rolling for 33 hours at 525° C. The ingot was hot-rolled to a gauge of 6.5 mm. The entry temperature at the first hot rolling pass was 521° C. and the final temperature on coiling was about 300° C. (the temperature of the coil varied from inner to outer layers). It was then subsequently cold rolled in multiple passes to 1.245 mm. Samples were obtained at final gauge and at an intermediate gauge of 1.9 mm. The cold reductions for these gauges were 81% and 71% respectively.

An additional sample was produced from a lab-rolled specimen of a conventional variant of AA5083 that additionally falls within the specifications for AA5086. The chemical composition of this sample is given in Table 3 below. It was received as commercially produced 0.5 inch thick plate. It was laboratory hot rolled with a starting temperature of 450° C. to a gauge of 3 mm. The temperature of the specimen at the end of hot rolling was not recorded. After cooling to ambient temperature, it was cold rolled to 0.75 mm, yielding a total cold reduction of 75%.

From the samples thus obtained, tensile specimens were prepared such that the tensile axis was parallel to the rolling direction. The tensile specimens were prepared by CNC machining to meet specifications according to ASTM E 21-05 "Standard Test Methods for Elevated Temperature Tension Tests of Metallic Materials".

This yields tensile specimens with a machined gauge length of 0.75 inch such that fiduciary marks may be drawn on the specimen surface at a spacing of 0.5 inch to be monitored by a video extensometer.

The heating practice followed for this study required that the specimen chamber be preheated to the desired temperature. On inserting the specimen, the time required for this furnace to return to its set temperature, within ±5° C. was recorded. The specimen was further allowed to recrystallize at this temperature for an additional 6 minutes. The tensile test was then commenced.

The tensile tests were performed at 450, 475, 500 and 525° C. Three tensile tests were performed at each temperature for the two sets of commercially produced material.

The tensile tests were performed at a constant crosshead speed such that the initial strain rate was $5 \times 10^{-3}$/s. The tensile tests were performed to fracture and the elongation to failure was recorded.

Metallographic examination of the deformed specimens was subsequently performed using optical and scanning electron microscopy.

Results

Figure 4:
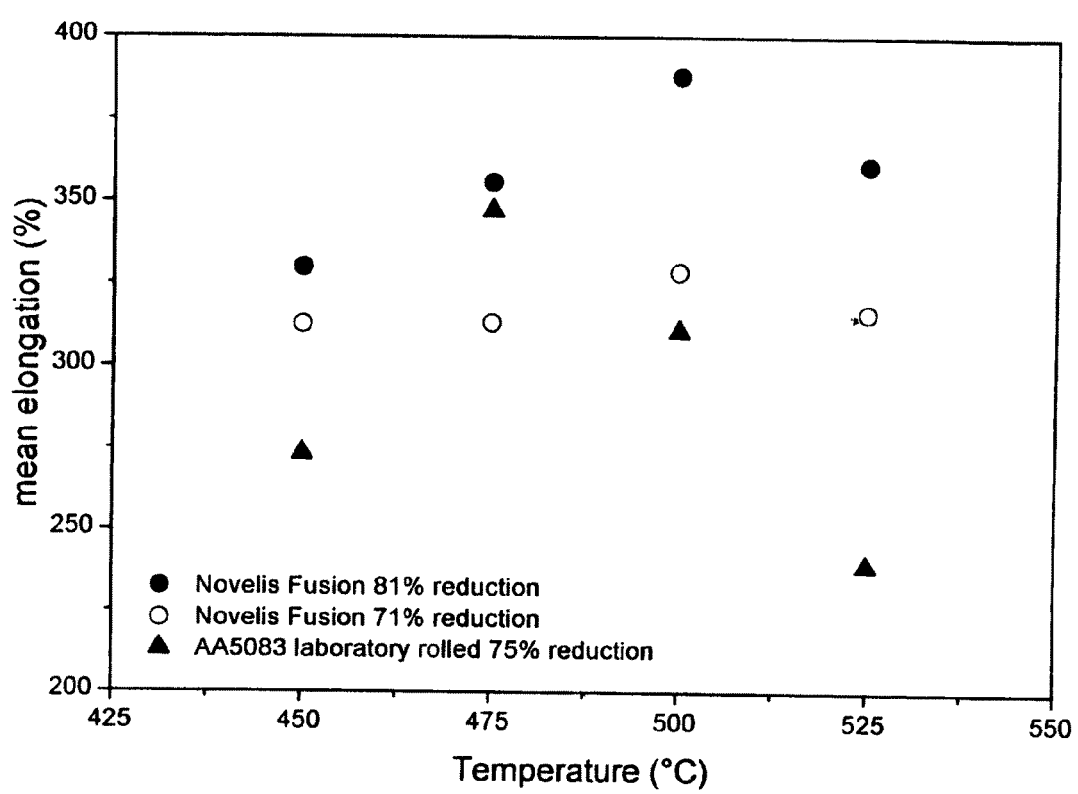
FIG. 4 is a graph showing mean elongations of the tensile tests versus temperature.

FIG. 4 shows the mean elongations to failure for the three materials at all test temperatures. However, for the 1.245 mm gauge material, one of the specimens tested at 525° C. failed prematurely near the shoulder of the tensile specimen and this was not included in the average.

The elongations to failure all exceed 300% and the data further indicate that increased cold reduction improves elongation to failure.

Figure 5A:
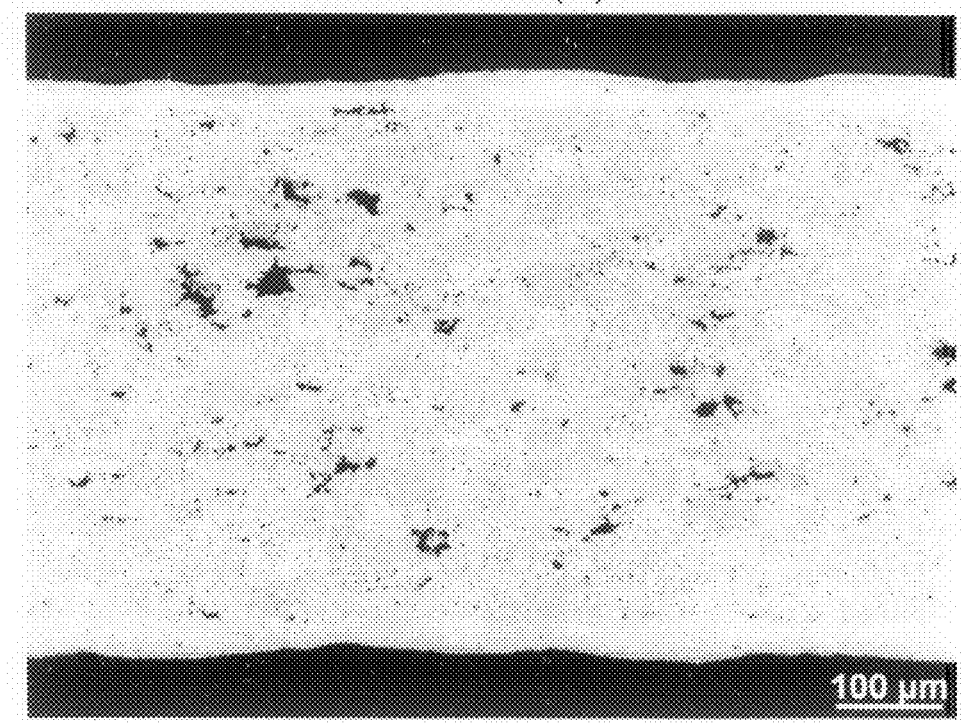
FIGS. 5(a) and 5(b) are optical micrographs of longitudinal transverse sections of metal products produced in the Experiments (FIG. 5(a) is one of the 1.245 mm thick specimens tested at 450° C.—this micrograph was taken 1 cm from the fracture surface—note that the cladding remains intact.
Figure 5B:
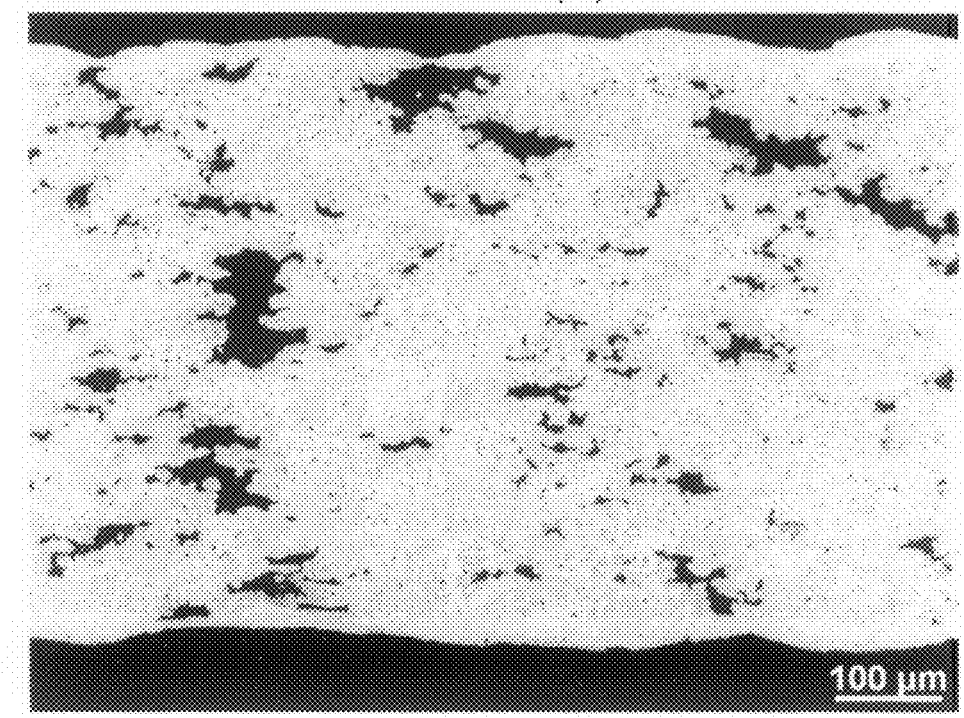

FIGS. 5(a) and 5(b) are optical micrographs of longitudinal sections taken near the fracture surfaces of two of the 1.245 mm specimens. One is from a specimen deformed at 450° C. (FIG. 5(a)) and the other for a specimen deformed at 525° C. (FIG. 5(b)). It shows the formation of voids in the core material and it additionally shows that the clad layer remains largely intact. The cladding does become particularly thin where there is a void immediately below the interface in the core.

Figure 6:
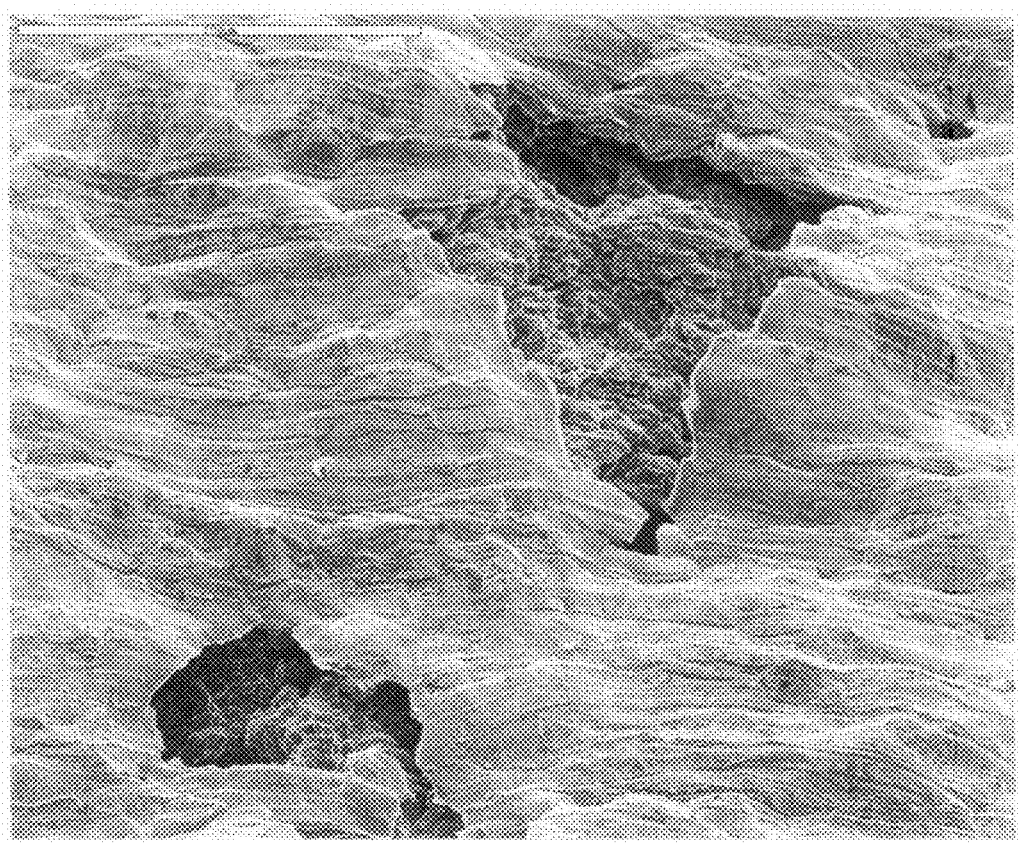
FIG. 6 is an SEM micrograph of the clad surface showing the "rumpled" texture.

FIG. 6 is a scanning electromicrograph (SEM) image from a sample showing the longitudinal edge of the specimen approximately 1 cm from the fracture surface showing the "rumpled" surface. The figure also shows two examples where the clad layer is breached, apparently due to voids in the core material immediately below the clad/core interface.

Discussion & Conclusions on Mechanical Properties

The clad material consisting of an AA5083 core with a dilute AA3003 cladding shows high tensile elongations at elevated temperature. The data additionally show that the clad layer remains intact during the deformation in spite of its lack of superplastic characteristics. The elongations obtained in the commercially produced material compare favourably with one example of a lab-produced conventional AA5083 alloy in terms of elongation at high temperature.

Part 2—Diffusion Simulations & Experiments

Mathematical Model

The DICTRA® application is part of the ThermoCalc® software package and allows the user to calculate concentration profiles based on the diffusion of various alloying elements. It includes the ability to simulate the formation of second phase particles and can predict their concentration profiles as well.

The computer simulations studied both clad alloys with the same AA5083 alloy core. The temperature in both cases was set to either 350° C. (623° K.) or 500° C. (773° K.) and the composition of the core was set to 4.75 wt % Mg, 0.2 Si and 0.05 Cu. This chemical composition is typical for an AA5083 alloy. Note that the other alloying additions of Cr, Fe & Mn were omitted for this study since these are very slow diffusing elements and should not affect the diffusion predictions. The composition of the clad layer for the Cu-containing case was set to Al with 1 wt % Cu and for the Al/Si alloy clad case the composition was Al-0.5 wt % Si. The modeled thickness of the clad layer was 0.1 mm and that of the core was 1.0 mm.

For the Si-containing case, the simulation was performed twice: once allowing second phase precipitates to form and in the second simulation, their formation was rejected. For the Cu-containing case, the simulations were all performed allowing the formation of precipitates. Simulation times were 5, 10, 15 and 30 minutes at both temperatures. Finally, the additional formation of precipitates during cooling to room temperature were assessed by simulating an exponential decay cooling curve such that the time to 25° C. was 20 minutes for each annealing temperature. This function type for the cooling curve is the most physically reasonable one for a hot object cooling to ambient conditions.

Experimental Procedures

The two different clad materials studied were prepared by roll-cladding. The core alloy, AA5083, was prepared by direct chill casting and from this ingot a 1.5 inch thick slice was removed. The length of this slab was 6 inches and the width 8 inches. A 0.15 inch wide groove was machined into the core alloy near the "head" of the slab on the top face along its full width. The composition of this alloy is identical to that described in section 'A' and its composition is given in Table 3 below.

TABLE 3

Chemical compositions of the Laboratory rolled AA5083 reference alloy. The composition quoted is in wt. %. The Zn content was not specified.

|  | Si | Fe | Cu | Mn | Mg | Cr | Zn | Ti |
|---|---|---|---|---|---|---|---|---|
| AA5083 | 0.087 | 0.317 | 0.027 | 0.547 | 4.258 | 0.074 |  | 0.005 |

Figure 7:
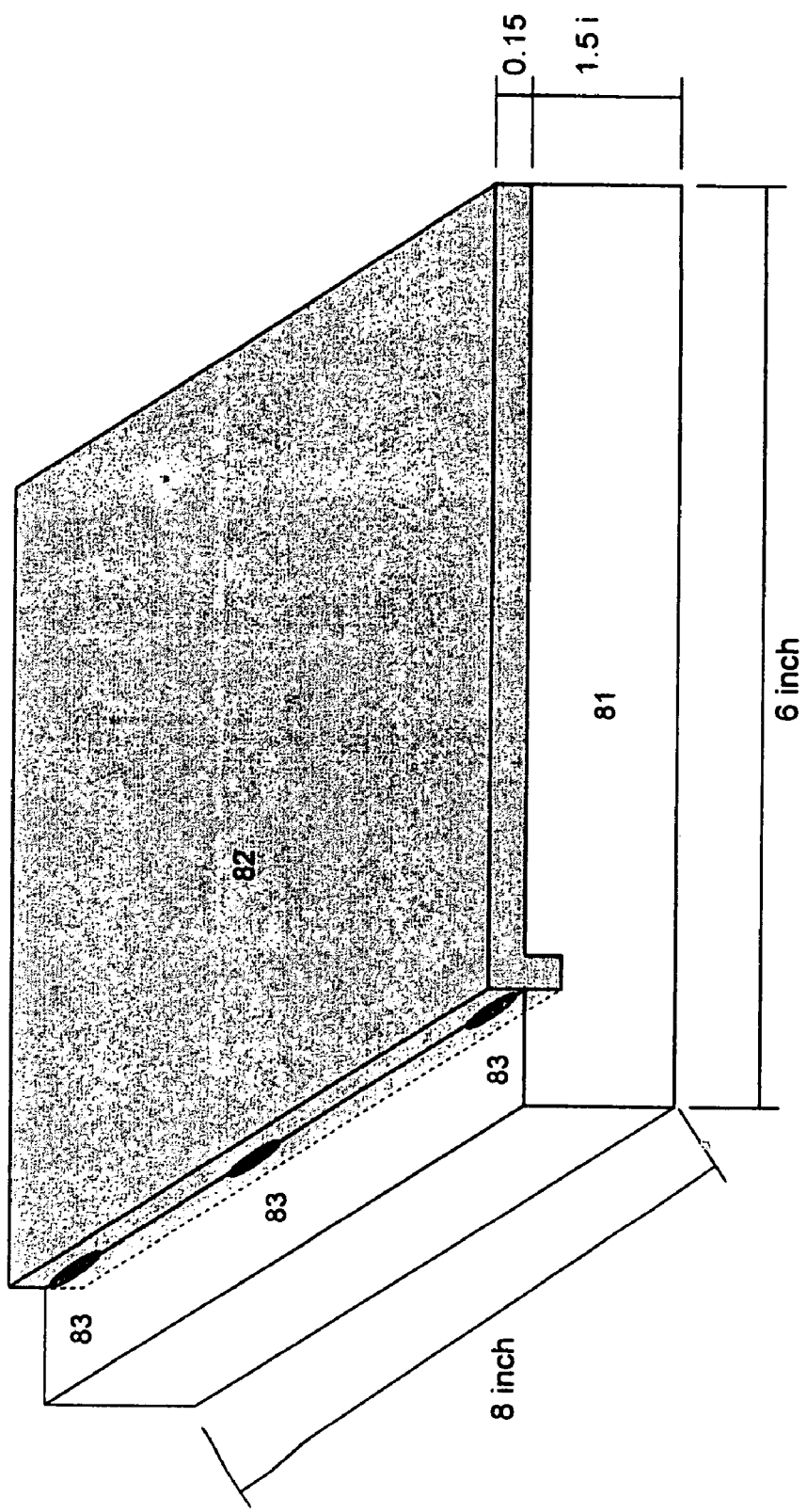
FIG. 7 is a sketch of the experimental clad assembly prior to roll cladding.

The clad alloys were cast in book molds, to 1 inch thickness. These book mold ingots were heated to 500° C. and rolled to the desired gauge of 0.15 inch. An 8 inch wide by 5.5 inch long piece was cut from this and one edge folded to a 90° bend to fit into the cut groove on the core alloy. To ensure that the clad layer remained affixed to the core during the initial rolling passes, three small weld beads were made along the leading edge of the clad/core groove: one at each edge and one in the middle. The construction of this is shown schematically in FIG. 7 in which numeral 81 indicates the core material with the cut groove, numeral 82 indicates the cladding material with a folded end inserted into the groove, and numeral 83 shows the weld beads tacking the cladding layer to the core. It is to be noted that the cladding layer had a thickness of 0.15 inch, and the core layer had a thickness of 1.5 inch, a width of 8 inches and a length of 6 inches.

The so-assembled clad package was heated in a furnace at 500° C. for 30 minutes and then rolled to a final gauge of 1 mm. The first passes were performed with only a small reduction to achieve a good metallurgical bond between the clad and core alloys. Once the good bond had been achieved, greater reductions per pass could be attained. No temperature control was employed during the roll cladding process.

Specimens were cut from the rolled sheet and annealed at either 350° C. for 30 minutes or at 500° C. for 2 hr. Longitudinal cross sections were prepared for optical metallographic examination. Optical microscopy was performed on these specimens to determine the formation of second phase particles and furthermore, a scanning electron microscope was used to determine the chemical composition profile by using the X-ray fluorescence method. Measurements of the composition were made every 5 micrometers from the clad surface to 100 micrometers into the core material.

Results & Discussion

Figure 8:
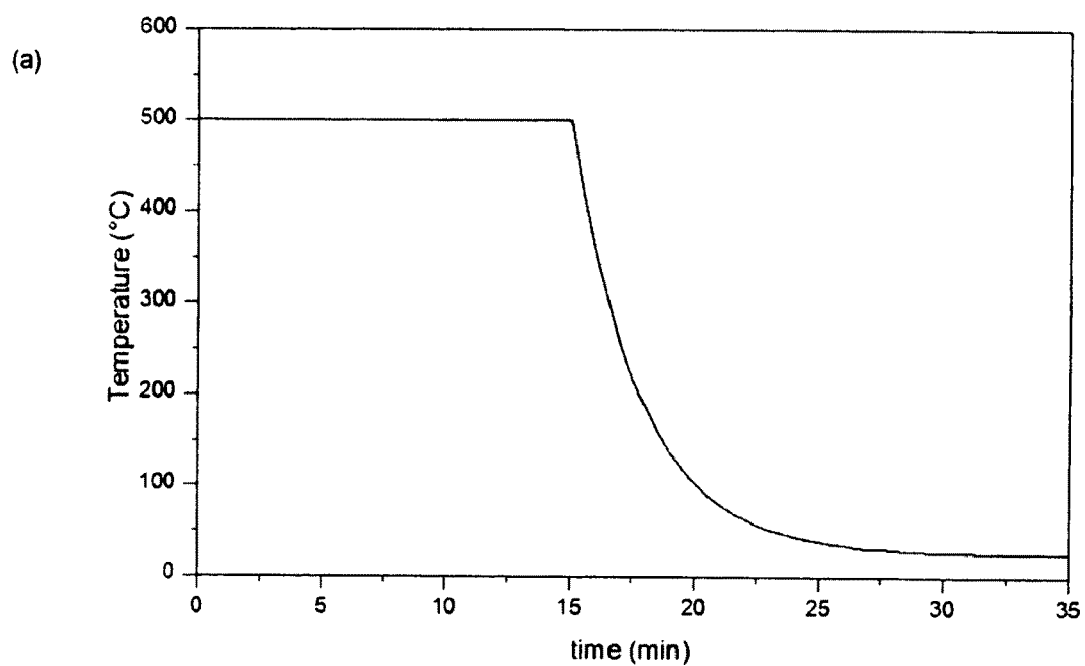
FIG. 8 is a plot of temperature vs. time and temperature vs. % Mg.

Computer simulations of the Si containing clad package are shown in FIG. 8, etc.

FIG. 8 shows an example of the time—temperature profile for the simulation performed with the 15 minutes isothermal anneal at 500° C. and its subsequent cooling to room temperature. The temperature profiles for the other cases have the same cooling curve but different isothermal annealing times.

Figure 9:
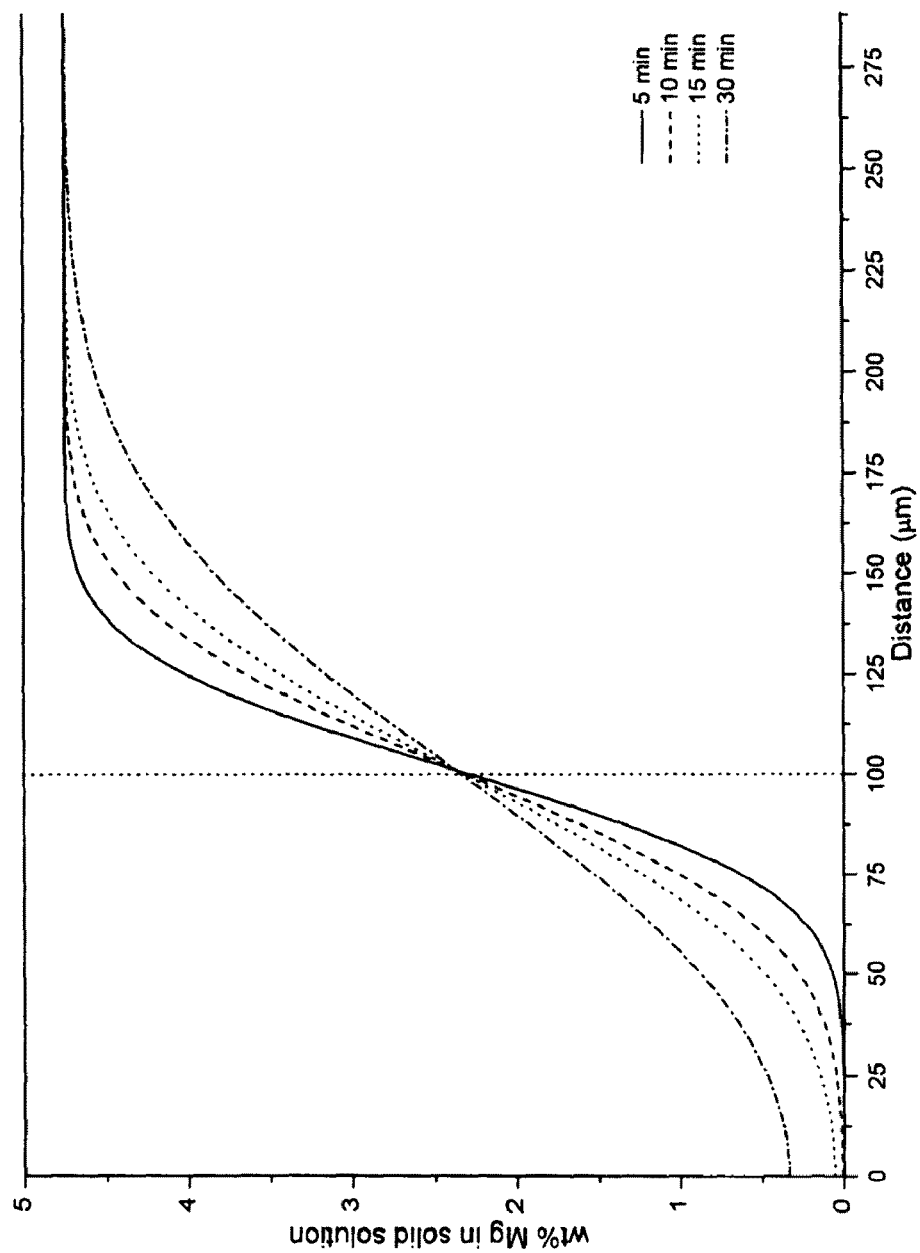
FIG. 9 is a plot of Mg content in solid solution for different annealing times.

FIG. 9 shows the composition profiles of Mg for the different annealing times at 500° C. for the simulations in which no precipitation was permitted to form. That is, all alloying elements are assumed to remain in solid solution. The profiles plotted are those at the end of cooling to room temperature. The Mg content is that in solid solution.

Figure 10:
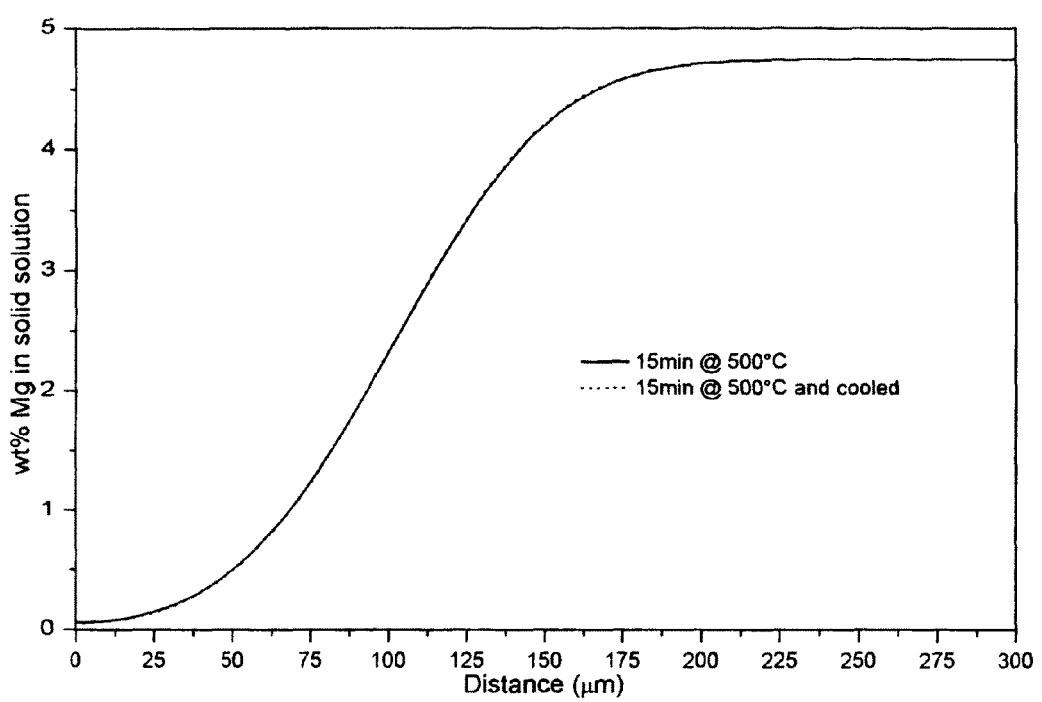
FIG. 10 is a plot of Mg content versus distance.

FIG. 10 compares the composition profile of the case for 15 minutes at 500° C. before and after cooling to room temperature. Note that there is little difference in the composition profile at the end of cooling compared to the end of the isothermal anneal at 500° C.

Figures 11A, 11B:
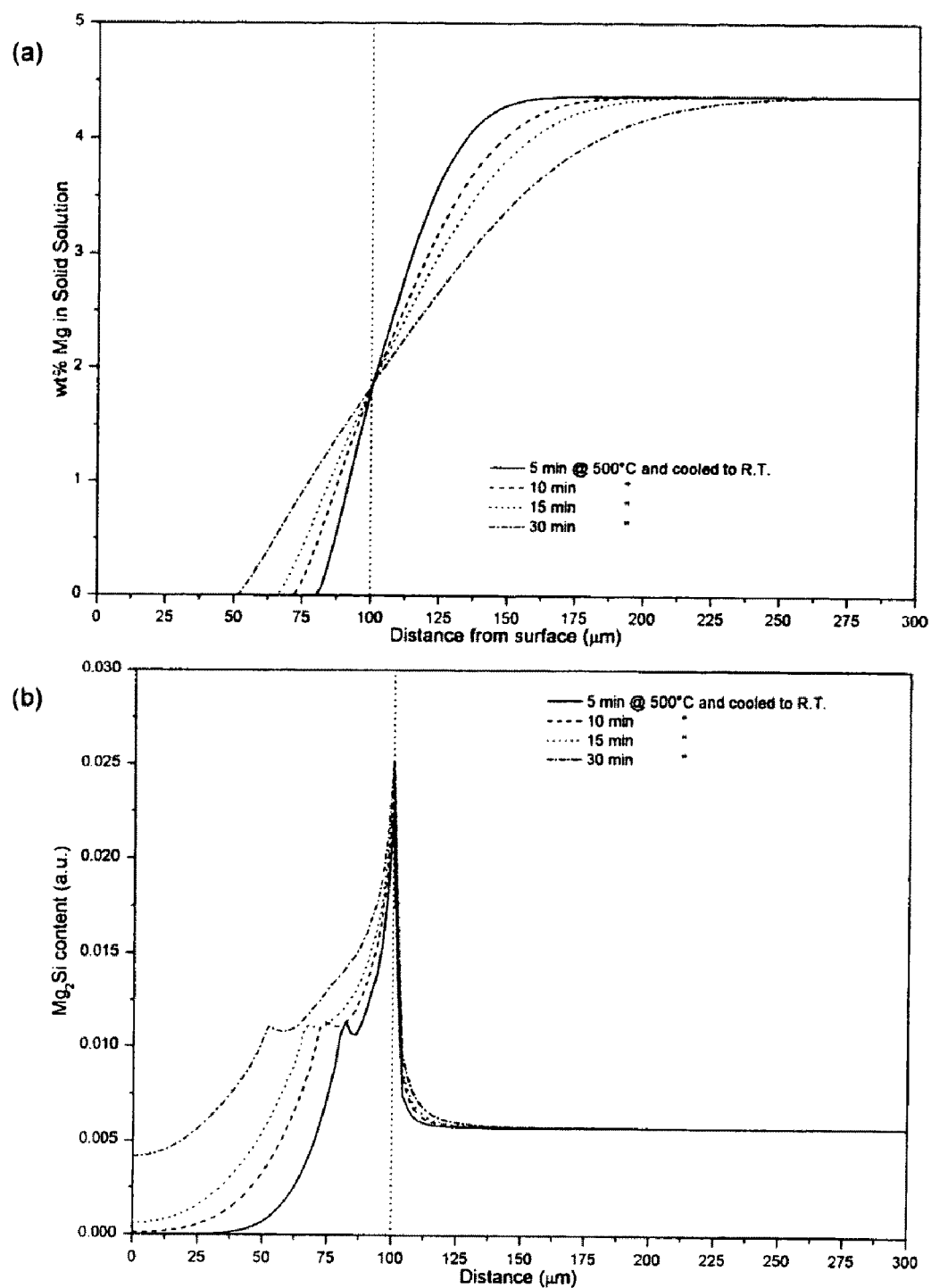
FIGS. 11(a) and 11(b) are plots of Mg content or $Mg_2Si$ content versus distance.

FIG. 11(a) contains the plots of the Mg in solid solution composition profiles with the simulations now allowing $Mg_2Si$ to form. Note the drop in concentration of the Mg in the core alloy far from the interface. This is due to the reaction of the Mg and Si in the AA5083 alloy and reduces the Mg and Si solid solution concentrations. Furthermore, it may be noted that the Mg content at the surface of the clad layer (x=0) is now much lower than that in the previously simulated cases in which no precipitates were formed. FIG. 11(b) shows the $Mg_2Si$ content profiles. The sharp peak near the interface is due to the immediate availability of Mg from the core to form large quantities of $Mg_2Si$. Furthermore, it may be noted that there is some Si diffusion from the clad layer into the core and this is reflected by an increased $Mg_2Si$ content within the core near the interface.

Figure 12:
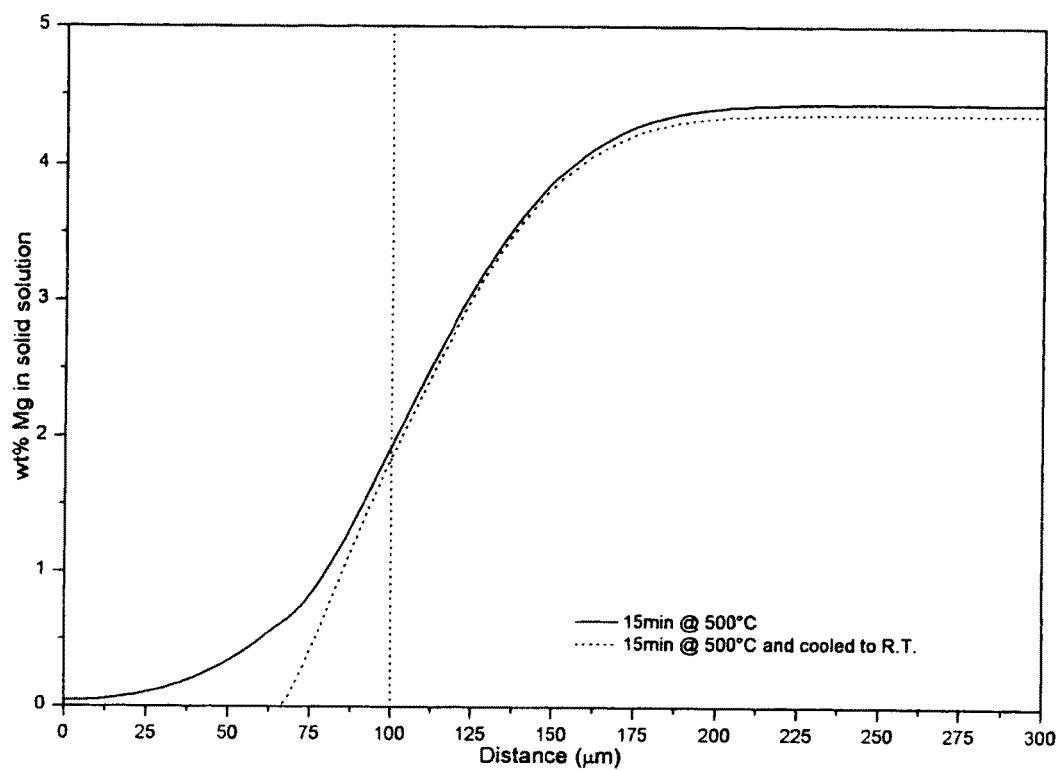
FIG. 12 is a plot of Mg content in solid solution versus distance.

FIG. 12 compares the Mg profiles before and after cooling for the 15 minute anneal case at 500° C. In contrast to the results plotted in FIG. 4, the cooling does have an effect on the Mg solid solution content. The difference is due to the decreased solid solubility of Mg and Si at decreasing temperatures, encouraging the formation of $Mg_2Si$ particles.

Figures 13A, 13B:
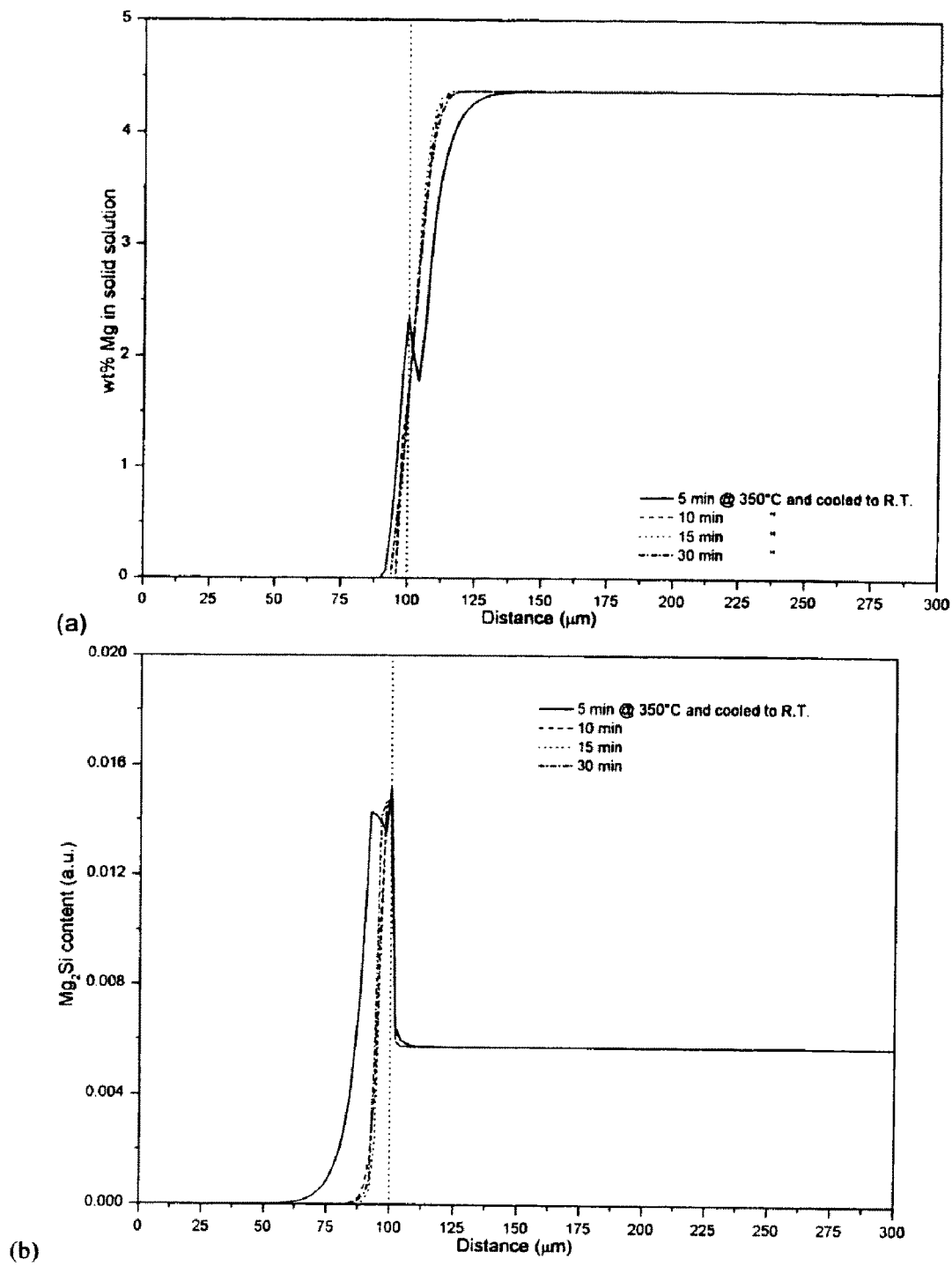
FIGS. 13(a) and 13(b) are plots of Mg content or $Mg_2Si$ content with distance.

FIGS. 13(a) and 13(b) contain the results of the simulations performed at 350° C. for the various times. Note that the Mg diffuses over a shorter range than at 500° C. due to the lower diffusivity at this temperature. The Mg profiles for the simulations in which $Mg_2Si$ was allowed to form again show a reduced diffusion distance.

Experimental Results for the Si Containing Clad Package

Figure 14A:
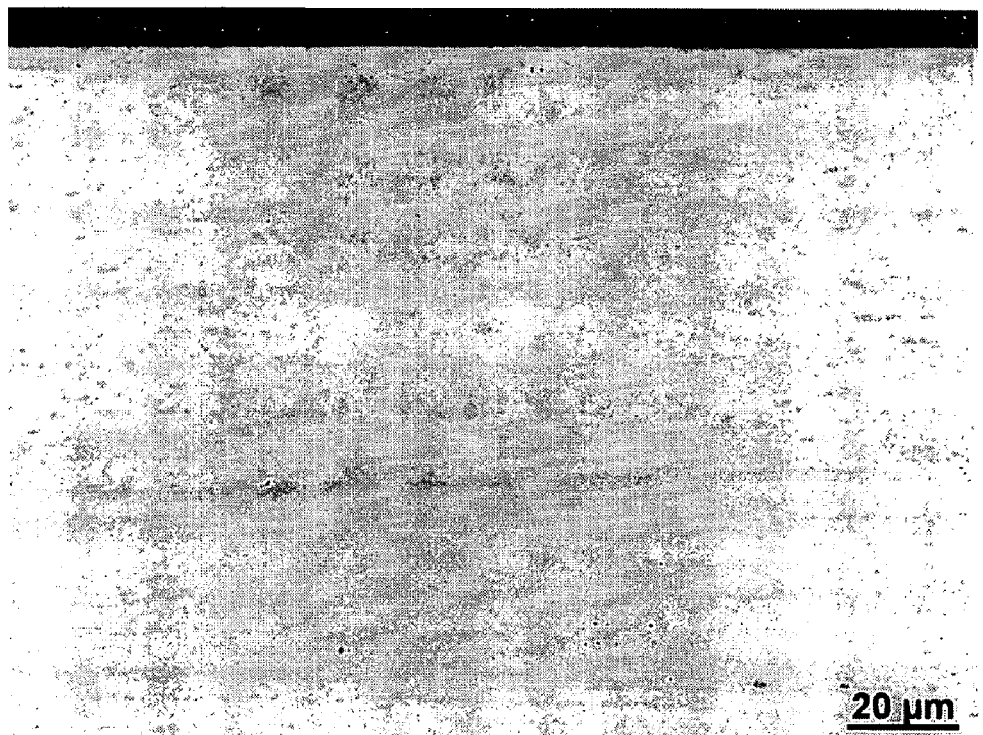
FIGS. 14(a), 14(b) and 14(c) are micrographs of Si-containing clad packages (a) as-rolled, (b) after 30 minutes at 350° C., and (c) after 2 hr at 500° C.
Figure 14B:
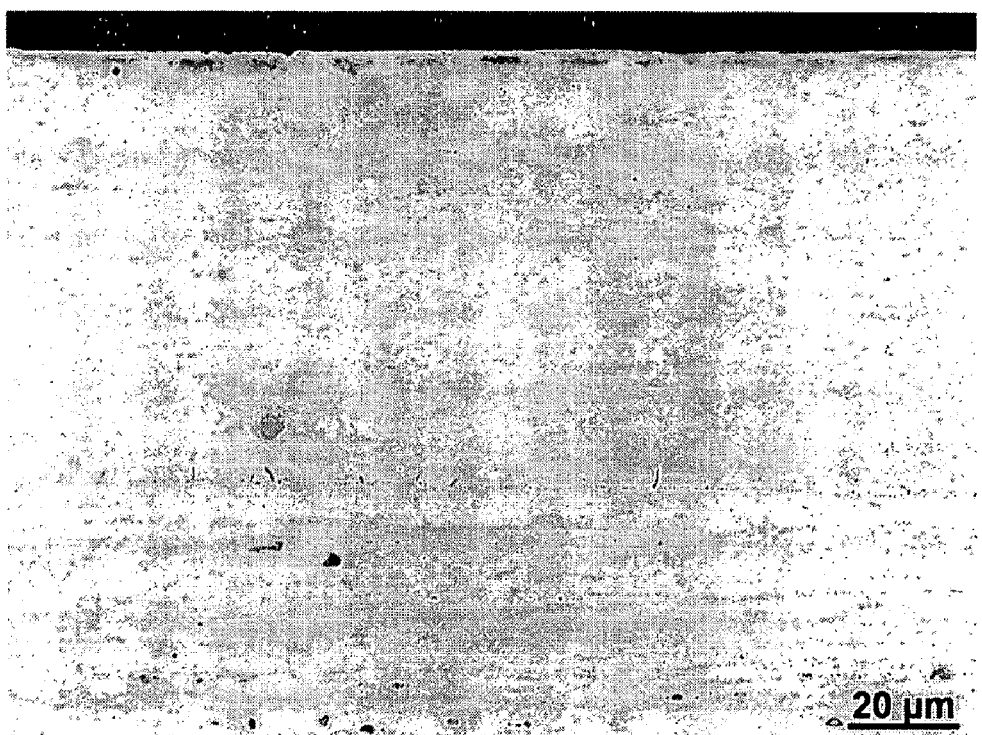
Figure 14C:
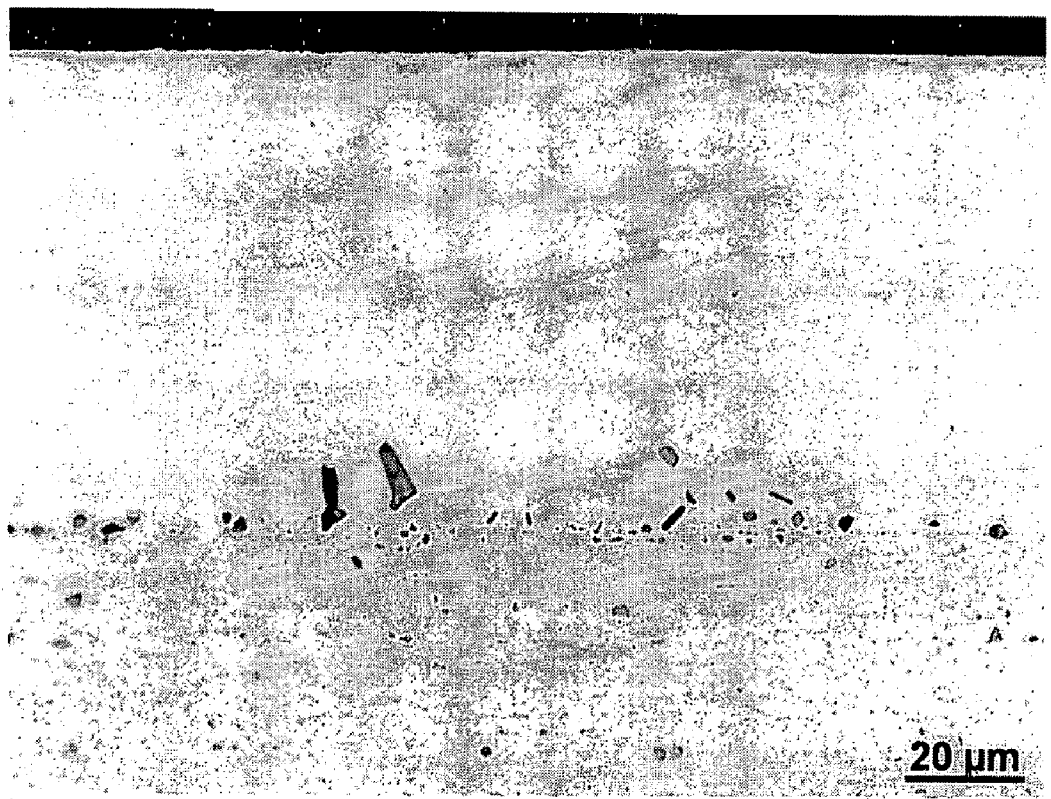

FIGS. 14(a), 14(b) and 14(c) show micrographs of the roll-clad experimental system with the Si-containing clad layer at various conditions. FIG. 14(a) shows the clad layer and the near interfacial region of the core in the as cold-rolled condition; FIG. 14(b) shows the microstructure after annealing the specimen at 350° C. for 30 minutes; and FIG. 14(c) shows the microstructure after annealing at 500° C. for 2 hr.

From FIG. 14(a), it may be noted that there are no intermetallic particles at the interface and that a good metallurgical bond has been created during the roll-cladding process. The small specks in the clad region are Si particles. The microstructure after 30 minutes at 350° C. shows $Mg_2Si$ particles extending from the interface into the clad layer. The width of the particles is approximately 1 micrometer or less, while some of them extend several micrometers from the interface into the clad region. On annealing for 2 hr at 500° C., very large $Mg_2Si$ particles are created near the original interface. Furthermore, there appears to be an Si denuded zone in the clad layer extending to approximately 50 micrometers from the clad/core interface. This is delimited with the 'upper' part of the clad layer by a line of particles. This may be in agreement with the DICTRA® prediction of a 'spike' in the $Mg_2Si$ content at a similar distance from the interface. The apparent denuded zone may contain fine $Mg_2Si$ particles which are not visible in the micrograph, in contrast to the Si particles which are visible.

Figure 15:
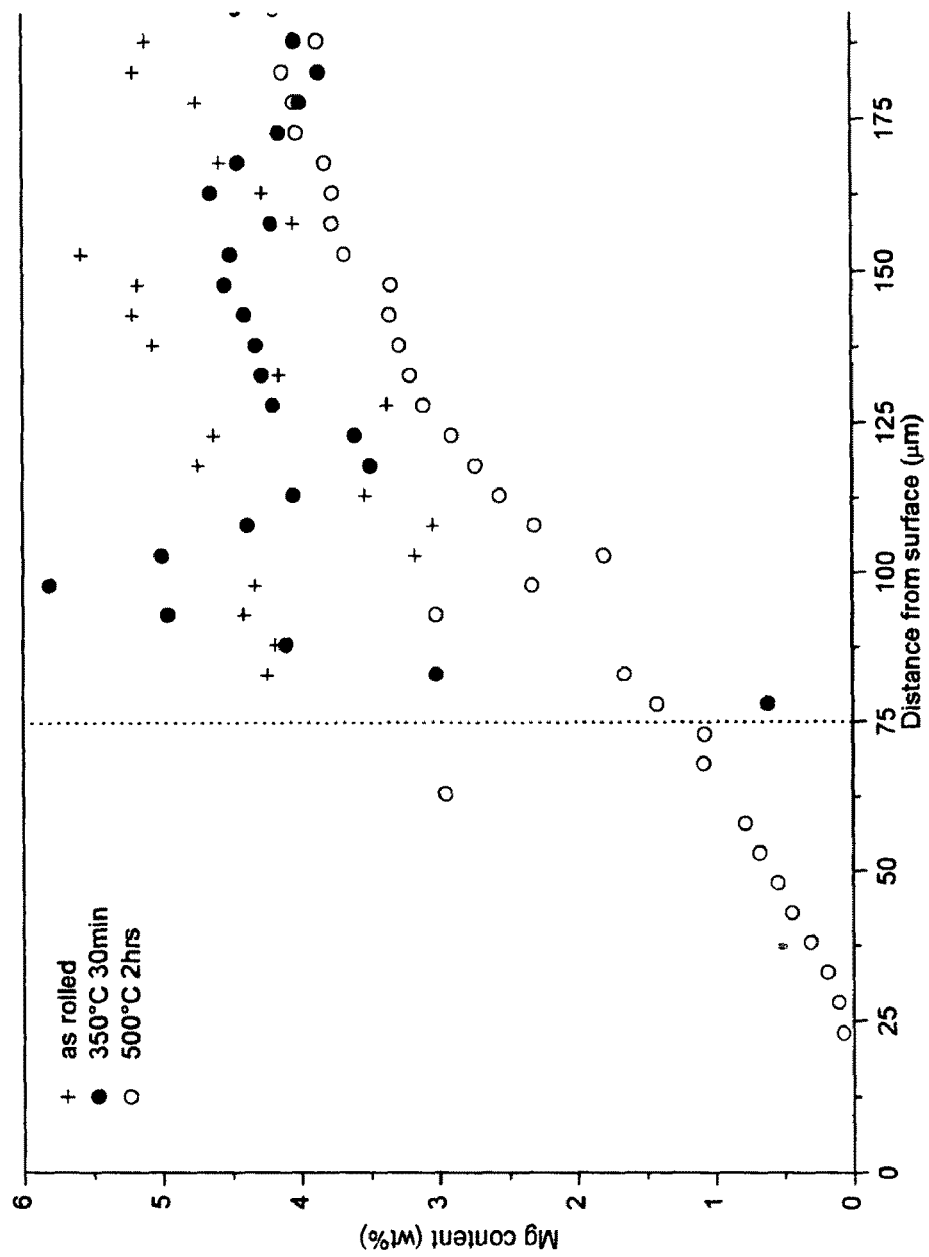
FIG. 15 is a plot of Mg content versus distance from clad surface.

FIG. 15 shows a plot of the Mg content vs. distance from the clad surface for the as-rolled, 30 mm at 350° C. and 2 hr at 500° C. cases determined from energy dispersive x-ray spectroscopy (EDXS) spot analyses using the SEM. The Mg profiles are in moderate agreement with the predictions calculated using DICTRA®. The variations in the Mg content may be attributed to interactions with large Mg-containing particles. That is, for some of the spot measurements, the measured volume may have (partially) contained a large $Mg_2Si$ particle, thereby overestimating the mean Mg content. Furthermore, the EDXS method cannot distinguish between Mg in solid solution and that in intermetallic particles such as $Mg_2Si$.

Computer Simulations of the Cu Containing Clad Package

The ThermoCalc® software package indicates that for an alloy containing 5 wt % Mg and 1 wt % Cu the solvus for $Al_2CuMg$ is 485° C. while that for $Al_6CuMg_4$ is 238° C.

Figure 16A:
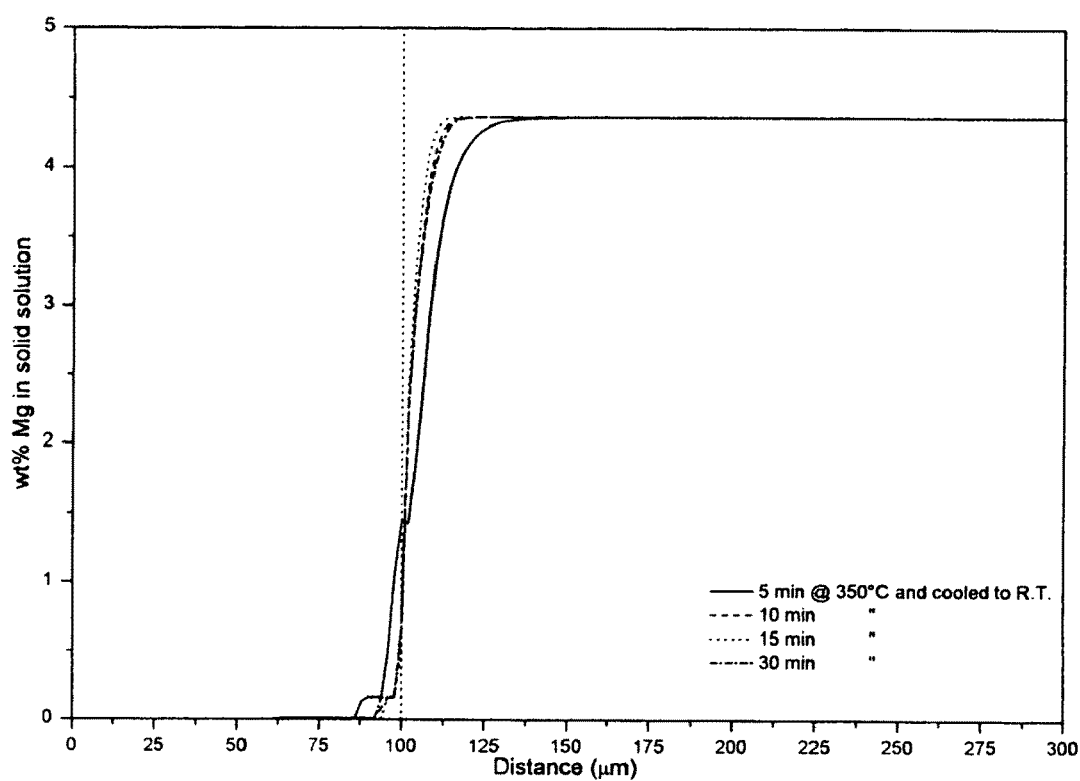
FIGS. 16(a) and 16(b) are plots of Mg concentration and intermetallics concentration versus distance.
Figure 16B:
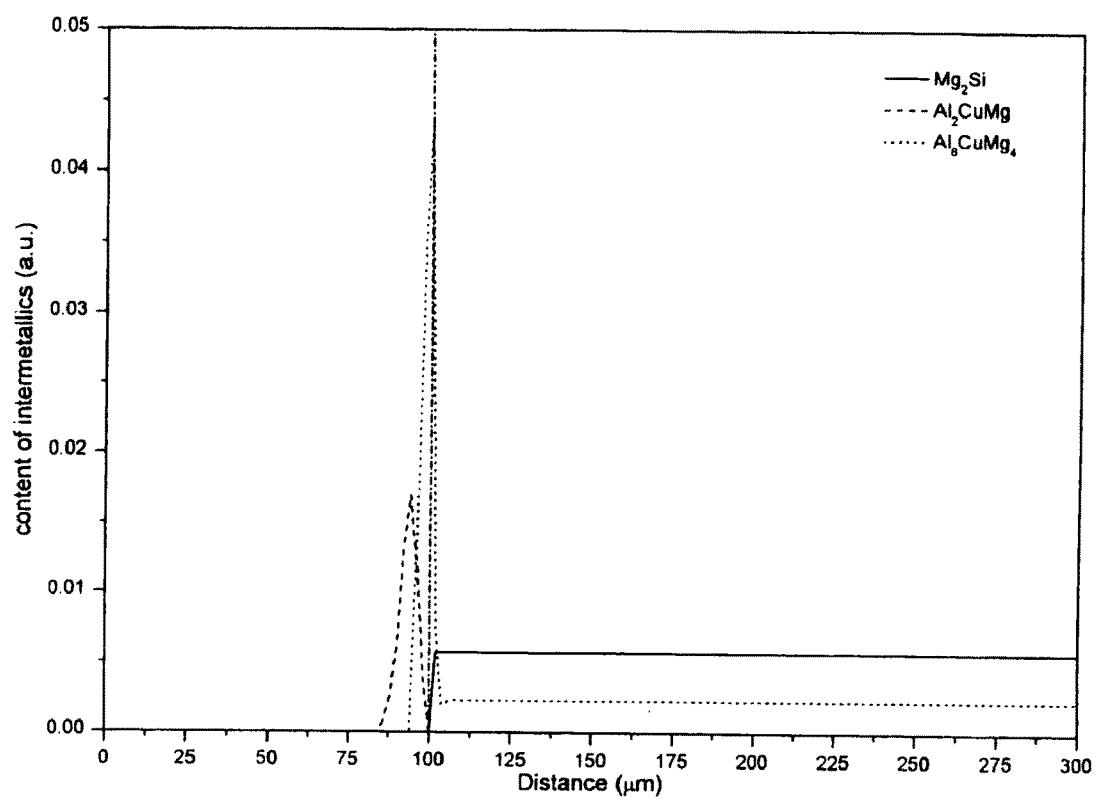

The time-temperature profiles used for these simulations were identical to those for the Si-containing clad layer. FIG. 16(a) compares the Mg profiles at 350° C. after the various simulated times. It is reminded that these simulations were performed with the software allowing intermetallic particles to form. The Mg in solid solution has now decreased due to the formation of these particles on cooling. FIG. 16(b) shows the composition profiles of the predicted intermetallic phases after 30 minutes at 350° C.

Experimental Results for the Cu Containing Clad Package

Figure 17A:
FIGS. 17(a), 17(b) and 17(c) are micrographs of a Cu-containing clad package (a) as-rolled; (b) after 30 minutes at 350° C., and (c) after 2 hr at 500° C.
Figure 17B:
Figure 17C:

FIGS. 17(a), 17(b) and 17(c) are micrographs of the roll-clad experimental system with the Cu-containing clad layer at various conditions. FIG. 17(a) shows the clad layer and the near interfacial region of the core in the as cold-rolled condition; FIG. 17(b) shows the microstructure after annealing the specimen at 350° C. for 30 minutes; and FIG. 17(c) shows the microstructure after annealing at 500° C. for 2 hr.

As with the Si-containing case, the as-rolled specimen shows that a good metallurgical bond was achieved in the roll-cladding process. After annealing for 30 mm at 350° C., particles are found to have formed along the interface between the clad and core alloys. This indicates that a reaction to form Al~Cu~Mg intermetallics did occur. In contrast, annealing at 500° C. did not produce second phase particles. This is expected from the phase diagram which shows that at this temperature only one phase is present: the α-Al solid solution.

Figure 18:
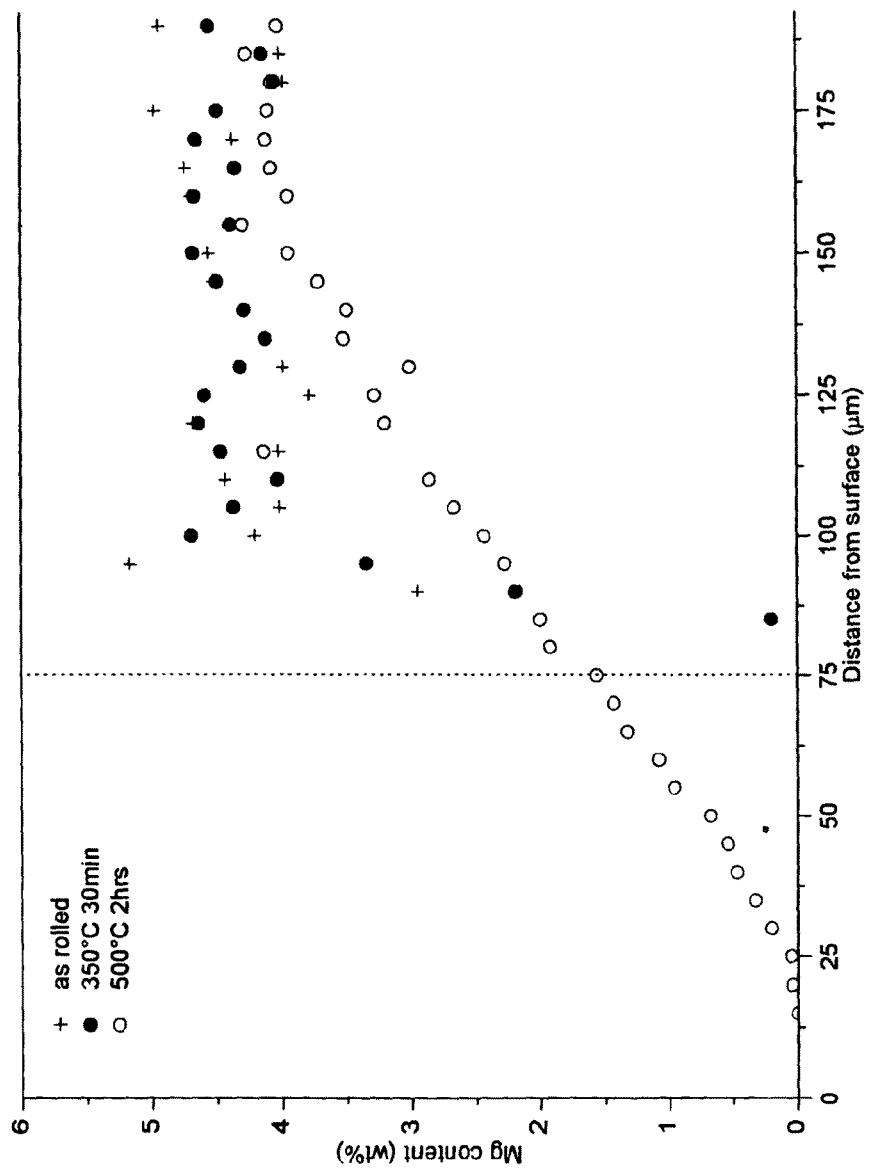
FIG. 18 is an Mg content profile after the various treatments.

FIG. 18 shows a plot of the Mg content vs. distance from the clad surface for the as-rolled, 30 minutes at 350° C. and 2 hr at 500° C. cases determined from EDXS spot analyses using the SEM. The Mg profiles are in moderate agreement with the predictions calculated using DICTRA®. The variations in the Mg content may be attributed to interactions with large Mg-containing particles. That is, for some of the spot measurements, the measured volume may have (partially) contained a large intermetallic particle, thereby overestimating the local Mg content. Furthermore, the EDXS method cannot distinguish between the Mg in solid solution and that contained in intermetallic particles such as $Mg_2Si$ or $Al_2CuMg$, for example.

Conclusions

The use of alloying additions in a clad layer which form intermetallic particles with a fast diffusing species, such as Mg in Al, reduce that element's concentration in solid solution. For the case of Mg in Al, the presence of Si or Cu in the clad layer can reduce the Mg content in solid solution at the clad surface to very low levels.

Experiment 2

This Experiment report describes the results of diffusion simulations performed using the DICTRA software package to assess the minimum thickness of the clad layer required to inhibit the formation of MgO for a particular core/cladding alloy combination during superplastic forming conditions.

Simulation Conditions

Two clad packages are considered for this study: the first comprises a pure aluminum clad layer with a core of 4.8% Mg. The second specifies a clad layer of Al-0.6% Si and the core containing the same binary alloy of Al-4.8% Mg. These are suitable model alloys approximating the Novelis clad packages containing an AA5083 core with the dilute 3003 clad or a modified 3xxx alloy containing 0.6% Si, respectively. Excluding all other alloying additions for these simulations is reasonable since the primary mechanism to inhibit the diffusion of Mg is the excess of Si. Furthermore, it is assumed that the other alloying additions of Mn, Fe and Cr are primarily 'trapped' in second phase particles and will not contribute significantly to the diffusion of Mg or Si.

The simulations were designed to determine the minimum clad thickness which will provide adequate protection against the formation of MgO at the surface. To this end, several simulations were performed for the two alloy combinations with varying clad thicknesses. The clad layer thicknesses chosen for this study were 10, 25, 50, 75 and 100 μm. The total thickness of the system was set to 250μm.

The criterion to distinguish between protected or not is the assumption that no MgO will form if the concentration of Mg in solid solution at the surface is less than 0.5 weight percent. All simulations received the same time and temperature conditions of 15 minutes at 500° C. This is a reasonable upper limit to the conditions used during superplastic forming of a product.

Results and Discussion

Figure 19A:
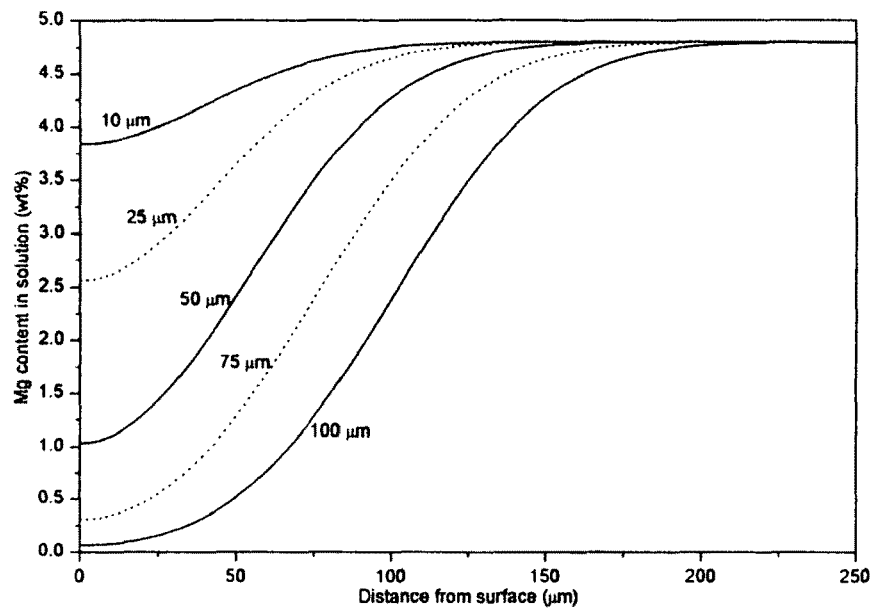
FIGS. 19(a) and 19(b) are plots of the Mg concentration in solution versus distance from the surface for (a) a pure aluminum clad layer; and (b) a Al-0.6wt % Si clad layer (the plots show the simulation results for each clad thickness studied, as labeled on the plots)
Figure 19B:
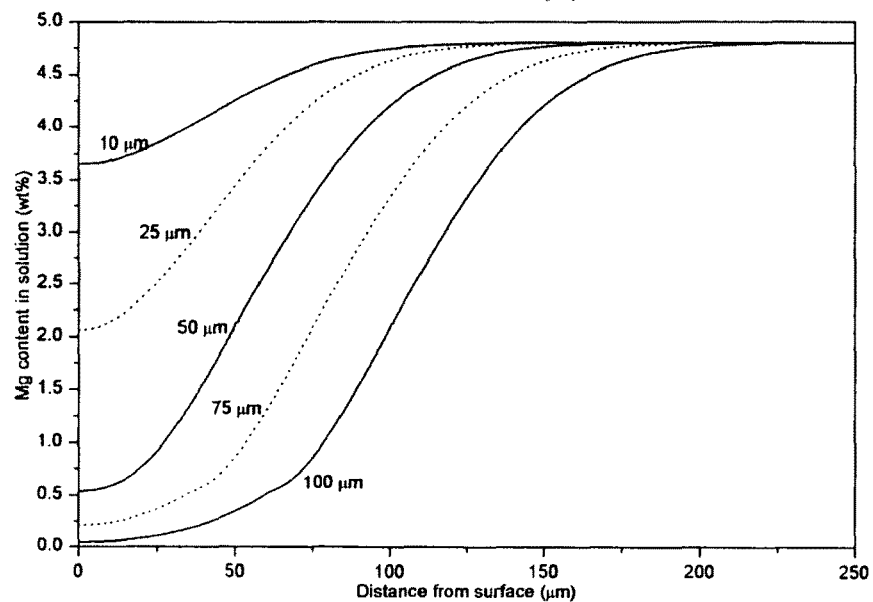

FIGS. 19(a) and 19(b) shows plots of the Mg in solid solution vs. distance for (a) the pure aluminum clad layer (FIGS. 19(a)); and (b) the Al-0.6wt % Si case (FIG. 19(b)). The plots show the composition profiles for each clad thickness studied.

Figure 20:
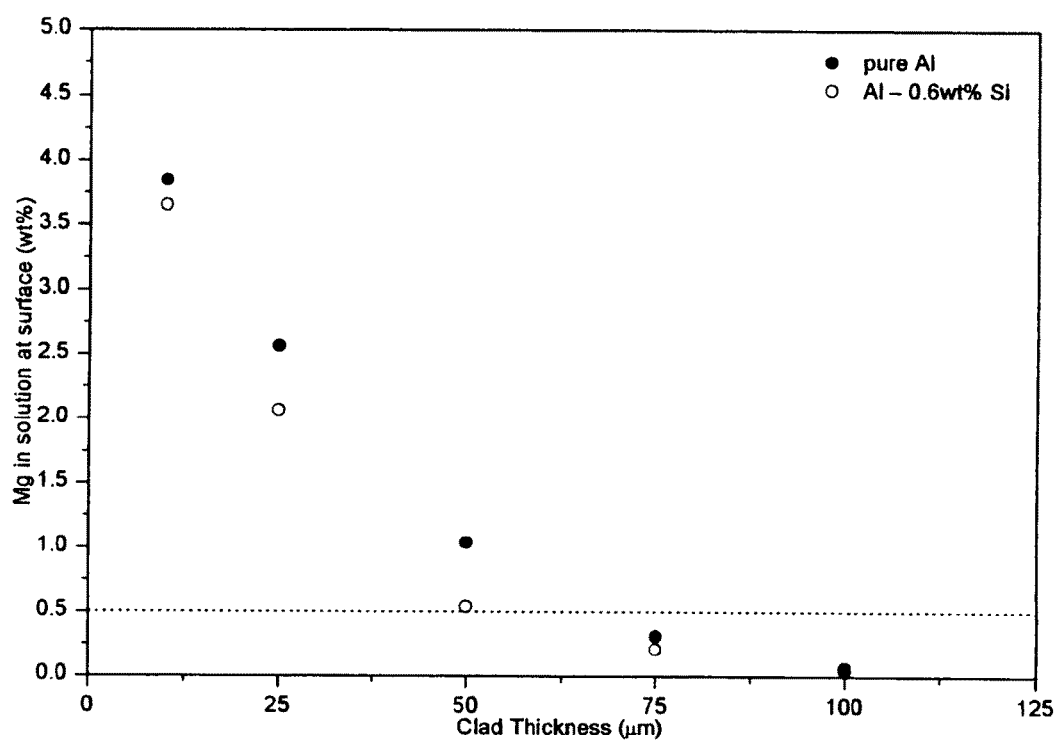
FIG. 20 is a plot of the Mg concentration in solution at the surface versus thickness of the clad layer, results for both pure Al and Al-0.6 wt % Si alloys being shown (the Si containing clad may be thinner for the same maximum allowable content of Mg).

FIG. 20 shows a plot of the Mg in solid solution at the surface vs. clad thickness for the two materials studied. This plot in particular is useful as it may be considered as the design criterion for this problem. Given that the minimum tolerated Mg content in solid solution at the surface is defined to be 0.5 wt %, a dashed line indicates the design criterion for the minimum thickness. From this plot it may be concluded that for the pure aluminum clad layer, the minimum clad thickness is 66 μm while for the Si containing one it is 54 μm.

At first glance, it may seem that there is a discrepancy between FIG. 19(b) and FIG. 11(a). The lines representing sheet with 100 μm of cladding and annealing for 15 minutes at 500° C. are significantly different in the two plots, even though the alloy systems are similar. This is because the data of FIG. 11(a) is for sheet that has been cooled to room temperature following annealing, whereas the sheet in FIG. 19(b) is still at 500° C. The difference in curve shape is highlighted in FIG. 12 and it is apparent that, when comparing like with like, the curves are in fact similar.

FIG. 20 shows a maximum spread of Mg concentration in the region of 25 to 50 μm for the cladding with and without Si. As the distance above and below these values increases, the data points appear to become more and more convergent. This is because at very low thicknesses, there is not much Si to form $Mg_2Si$, and therefore the diffusion behaviour of the Mg becomes similar in both types of cladding. At the very high thicknesses, the diffusion distance across the cladding helps to prevent the Mg from reaching the surface in either case.

Experiment 3

This section describes experiments performed to assess the maximum thickness of a non-superplastic clad layer on a superplastic core which still yields high elongations. The results suggest that the maximum allowable clad fraction is less than 30% (total cladding thickness) for the particular core/cladding alloy combination investigated.

Introduction

Previous studies on the use of clad products for superplastic forming have suggested that the allowable content of non-superplastic layers may be rather large and in excess of 50% of the total composition of the composite. Experiments were performed to assess the validity of those suggestions.

Experimental Procedures

Two alloys were examined in this study, namely a variant of AA5083 and a dilute AA 3003 alloy with excess Si. These two alloys were cast as book-moulds. Several book-moulds were cast of each to allow sufficient material to be used for producing a clad package by roll-bonding and additionally to process the individual alloys to determine their tensile properties at elevated temperatures. The book moulds were 25.4 mm thick each and approximately 150 mm×200 mm in width and length.

All the book-moulds were homogenized at 525° C. for 6 hours using heating and cooling rates of 50° C./hr. Two book-moulds of the dilute version of AA3003 were welded to one book-mould of the variant of AA5083, one on each face, such that the assembled structure could be clad by roll bonding during hot-rolling. The so-assembled structure was therefore ~76 mm thick and 150 mm×200 mm in width and length.

All samples were then heated to 450° C. and hot rolled to a gauge of 5 mm. All samples rolled well and in particular, the clad package showed very good bonding during the initial passes which was maintained throughout the hot rolling. To assess the maximum allowable fraction of non-superplastic alloy in the composite (the clad package), samples of the clad package were scalped to remove a desired fraction of the clad layers. Due to some curvature of the specimens, the scalping process was unable to achieve a good balance of clad thickness on each side. Table 4 lists the clad thickness in micrometers and as a fraction of the total for the different samples at final gauge.

After hot rolling (and scalping for some of the clad samples) all materials were cold rolled to a reduction of 80%. This degree of cold work is well known to yield an appropriate grain structure during recrystallisation to achieve superplastic behaviour in suitable alloys. The final gauge for the variant of AA5803, the dilute AA3003 and unscalped clad samples was therefore 1 mm. The final gauges of the scalped specimens depended on the amount of clad layer removed and the gauges are listed in Table 4. The thickness of the clad layer on the top and bottom of each material was measured in an optical microscope following the procedures described in ASTM B209 "Standard Specification for Aluminum and Aluminum-Alloy Sheet and Plate".

From the final gauge materials, tensile specimens were prepared following the specifications in ASTM E 21-05 "Standard Test Methods for Elevated Temperature Tension Tests of Metallic Materials" parallel to the rolling direction. Three tensile specimens were prepared from each final gauge material. The elevated temperature tensile tests were performed at 500° C. This is known to be a temperature at which superplastic AA5083 alloy variants can achieve very high elongations. The specimens were placed in the tensile testing machine at the high temperature and were allowed 12 minutes to return to the target temperature and some "soak" time to allow recrystallisation to be completed prior to loading. The tensile deformation was applied at a constant elongation rate with an initial strain rate of 5×10-3/s. This is known to be a suitable elongation rate for superplastic deformation. The elongations to failure were determined by measuring the length of the specimens after fracture. The elongation to failure is calculated by the following equation:

$$\varepsilon = \frac{L-l}{l} \times 100\%$$

where L is the length at failure and 1 the original length.

Results and Discussion

Table 5 lists mean the elongations to failure for all the materials. It may be noted that, as expected, the variant of AA5803 shows superplastic behaviour with elongations in excess of 300%. The dilute AA3003 material shows elongations of less than 100%. While this is greater than that which may be attained at room temperature testing of this material, the elongation to failure cannot be described as typical of superplastic behaviour. This demonstrates that the dilute AA3003 alloy is not a superplastic alloy.

Considering the clad specimens, none show particularly high elongations to failure. Given that experience has shown that elongations of at least 250% must be achieved in the rolling direction to show acceptable forming behaviour, it may be concluded that none of the clad packages would be suitable as a superplastic composite. Based on this, it may be suggested that the maximum allowable clad fraction to achieve a superplastic composite where the clad material is not a superplastic alloy is less than 30% of the total composite.

TABLE 4

Thicknesses of the clad layers of the clad packages

| Gauge (mm) | Top (mm) | Bottom (mm) | Total clad fraction (top and bottom) |
|---|---|---|---|
| 1.05 | 0.325 | 0.343 | 64% of dilute AA3003 |
| 0.78 | 0.180 | 0.195 | 48% of dilute AA3003 |
| 0.57 | 0.067 | 0.147 | 38% of dilute AA3003 |
| 0.54 | 0.017 | 0.147 | 30% of dilute AA3003 |

TABLE 5

Elongations to failure for all materials studied. For the clad materials, the core is a variant of AA5803 and the total fraction of the clad layers of dilute AA3003 is used to identify the material.

| Material | elongation to failure (%) |
|---|---|
| Dilute AA3003 | 99 ± 4 |
| Variant of AA5803 | 328 ± 17 |
| 64% dilute AA3003 | 114 ± 5 |
| 48% dilute AA3003 | 165 ± 39 |
| 38% dilute AA3003 | 132 ± 37 |
| 30% dilute AA3003 | 106 ± 4 |

It should be noted that, while the elongation values change unpredictably between 64 and 30% cladding ratios, i.e. the values are higher in the intermediate cladding thicknesses than at the lowest thickness (30%), this may be due to problems of obtaining consistent cladding thicknesses in the laboratory scale method employed for this test (note, for example, the difference between the top and bottom cladding thicknesses at the lowest gauge of 0.54 mm, even though these numbers are averages over three tensile test samples in each case).

The clad thicknesses studied in this section were too high to show the point of transition between non-superplastic and superplastic behavior. The results do show that, for these alloys, thickness down to 30% (i.e. 15% per side for a two clad layer product), the behavior remains non-superplastic. Previous tests have shown that thickness of 15% (7.5% per side) do show superplastic behavior, so the transition is between these properties likely takes place at a thickness in the range of 15 to 25% or 15 to 20%, and most likely takes place gradually in the range of 20 to 25% of product thickness.

The invention claimed is:

1. A method of producing a clad sheet article, which method comprises:
    providing a cladding of an aluminum alloy on at least one face of a core ingot made of an aluminum alloy having superplastic properties by co-casting to form a clad ingot; and rolling said clad ingot to produce a sheet article having a core layer and at least one cladding layer;
    wherein said aluminum alloy of said core ingot includes magnesium as an element that diffuses from an interior of the core layer to a surface thereof at temperatures required for superplastic forming of said article and that causes surface deterioration when present at an outer surface of said article, and said cladding layer is chosen to include silicon present in an amount of 0.3 wt. % or more as an element that interacts with said magnesium of the core to reduce diffusion of said magnesium of the core through said cladding layer.

2. The method of claim 1, wherein said silicon is present in a range of 0.5-2.0 wt. %.

3. The method of claim 1, wherein said silicon is present in a range of 0.5-1.0 wt. %.

4. The method of claim 1, wherein said cladding layer in said sheet article after said rolling has a thickness of at least 50 micrometers.

5. The method of claim 1, wherein said cladding layer in said sheet article after said rolling has a thickness in a range of 75 to 500 micrometers.

6. The method of claim 1, wherein said cladding layer in said sheet article after said rolling has a thickness in a range of 100 to 150 micrometers.

7. The method of claim 1, wherein said magnesium is present in said core in an amount of at least 4 wt. %.

8. The method of claim 1, wherein said core contains zinc, and said magnesium is present in said core in an amount of at least 1.9 wt. %.

9. The method of claim 1, wherein said co-casting step is carried out by casting the core ingot onto the cladding layer at a point where the metal of the cladding layer is at a temperature between the solidus temperature and liquidus temperature of the metal of the cladding layer.

10. The method of claim 1, which comprises co-casting said cladding layer onto both rolling faces of the core ingot.

11. A method of improving a surface appearance of a sheet article made of a superplastic aluminum alloy containing magnesium, which comprises cladding a surface of said superplastic alloy with a layer of an aluminum alloy containing silicon in an amount of 0.3 wt. % or more that reduces diffusion of said magnesium through said layer.

12. A method of producing a clad ingot, which method comprises:
    providing a cladding of an aluminum alloy on at least one face of a core ingot made of an aluminum alloy having superplastic properties by co-casting to form a clad ingot;
    wherein said aluminum alloy of said core ingot includes magnesium as an element that diffuses from an interior of the core layer to a surface thereof at temperatures required for superplastic forming of an article produced from said clad ingot by rolling, and that causes surface deterioration when present at an outer surface of said article, and said cladding layer is chosen to include silicon present in an amount of 0.3 wt. % or more as an element that interacts with said magnesium of the core to reduce diffusion of said magnesium of the core through said cladding.

* * * * *